US012254736B1

(12) United States Patent
Morris et al.

(10) Patent No.: US 12,254,736 B1
(45) Date of Patent: Mar. 18, 2025

(54) SYSTEMS AND METHODS FOR NAVIGATION-BASED GAMES

(71) Applicant: DK Crown Holdings Inc., Boston, MA (US)

(72) Inventors: Kyle Morris, Las Vegas, NV (US); Ashford Kneitel, Los Angeles, CA (US); Charles Raymond Mousseau, Winnipeg (CA)

(73) Assignee: DK Crown Holdings Inc., Boston, MA (US)

( * ) Notice: Subject to any disclaimer, the term of this patent is extended or adjusted under 35 U.S.C. 154(b) by 0 days.

(21) Appl. No.: 18/500,424

(22) Filed: Nov. 2, 2023

(51) Int. Cl.

| | |
|---|---|
| ***A63F 9/24*** | (2006.01) |
| ***A63F 11/00*** | (2006.01) |
| ***G06F 13/00*** | (2006.01) |
| ***G06F 17/00*** | (2019.01) |
| ***G07F 17/32*** | (2006.01) |
| ***G07F 17/34*** | (2006.01) |

(52) U.S. Cl.
CPC .......... *G07F 17/3211* (2013.01); *G07F 17/34* (2013.01)

(58) Field of Classification Search
USPC .............................. 463/1, 20, 22, 25, 29, 30
See application file for complete search history.

(56) References Cited

U.S. PATENT DOCUMENTS

| | | | | |
|---|---|---|---|---|
| 9,120,010 | B2 * | 9/2015 | Karn | G07F 17/32 |
| 2005/0261055 | A1 * | 11/2005 | Casey | A63F 3/00157 463/20 |
| 2007/0182096 | A1 * | 8/2007 | Jones | A63F 3/00 273/244 |
| 2020/0070055 | A1 * | 3/2020 | Du | A63F 13/822 |
| 2021/0150859 | A1 * | 5/2021 | Delekta | G07F 17/3295 |

* cited by examiner

*Primary Examiner* — Adetokunbo O Torimiro
(74) *Attorney, Agent, or Firm* — Foley & Lardner LLP

(57) ABSTRACT

Described herein are gaming systems and methods for providing a navigation-based game. A data processing system can receive a wager and present a graphical user interface with a plurality of rows or columns, each of which can include a respective set of spaces. Each space can correspond to a respective space condition that can cause the game state to be updated. The respective space condition of a subset of the respective set of spaces can include a termination condition that can cause a play of the game to terminate. The data processing system can receive input to initiate navigation of an icon to a target space of the respective set of spaces of a first row or a first column. The data processing system can determine an updated game state for the play of the game based on the respective space condition of the target space.

18 Claims, 13 Drawing Sheets

100B

SYSTEMS AND METHODS FOR NAVIGATION-BASED GAMES

BACKGROUND

Gaming machines or devices, such as networked gaming devices, can provide awards as a result of gaming events. Players generally place wagers to activate a game and can receive an award when a winning condition is met. However, it can be challenging to provide engaging interactive gaming content.

SUMMARY

At least one aspect of the present disclosure is directed to a navigation gaming system. The gaming system can include one or more processors coupled to memory. The one or more processors may receive a wager for a play of a navigation game. Upon receiving the wager, the one or more processors may generate a graphical user interface with a plurality of rows or columns. Each of the plurality of rows or columns includes a respective set of spaces. Further, each of the set of spaces corresponds to a respective space condition that causes a game state to be updated for the play of the navigation game. The respective space condition of a subset of the respective set of spaces includes a termination condition that causes the play of the navigation game to terminate. The one or more processors may receive input to initiate navigation of an icon to a target space of the respective set of spaces of a first row or a first column of the plurality of rows or columns. The one or more processors may determine an updated game state for the play of the navigation game based on the respective space condition of the target space.

In some implementations, the one or more processors may select a number of the respective set of spaces of each row or column of the plurality of rows or columns. Furthermore, in some implementations, the one or more processors may select the number of the respective set of spaces to be less than a predetermined threshold.

In some implementations, the one or more processors may cause the game state to be updated to terminate the play of the navigation game in response to determining that the respective space condition of the target space includes the termination condition.

In some implementations, the one or more processors may cause the graphical user interface to be updated to indicate an award amount for the play of the navigation game in response to determining that the respective space condition of the target space includes a win condition.

In some implementations, where the play of the navigation game may include a health score with a predetermined value, the one or more processors may determine that the respective space condition of at least one space within a row or a column is a predetermined decrement condition that causes the game state to be updated to decrement the health score of the play.

In some implementations, the one or more processors may determine that the respective space condition causes the game state to accept additional input to navigate to a second row or a second column of the plurality of rows or columns.

In some implementations, the one or more processors may generate a respective score for each row or column based on the respective space condition of each space of the plurality of rows or columns.

In some implementations, the one or more processors may cause the graphical user interface to include an interactive element that, when interacted with, causes the one or more processors to update a credit balance based on the position of the icon in the plurality of rows or columns.

In some implementations, the one or more processors may determine, based on the game state, that the icon has been navigated to a final row or a final column of the plurality of rows or columns and adjust a credit balance based on a bonus amount responsive to determining that the icon has been navigated to the final row or the final column.

At least one aspect of the present disclosure is directed to a method of a navigation gaming system. The method can include receiving a wager for a play of a navigation game. The method can cause the generation of a graphical user interface with a plurality of rows or columns. Each of the plurality of rows or columns includes a respective set of spaces. Further, each of the set of spaces corresponds to a respective space condition that causes a game state to be updated for the play of the navigation game. The respective space condition of a subset of the respective set of spaces includes a termination condition that causes the play of the navigation game to terminate. The method can include receiving input to initiate navigation of an icon to a target space of the respective set of spaces of a first row or a first column of the plurality of rows or columns. The method can include determining an updated game state for the play of the navigation game based on the respective space condition of the target space.

The method can include selecting a number of the respective set of spaces of each row or column of the plurality of rows or columns. The method can also include selecting the number of the respective set of spaces to be less than a predetermined threshold.

The method can include causing the game state to be updated to terminate the play of the navigation game responsive to determining that the respective space condition of the target space comprises the termination condition.

The method can include causing the graphical user interface to be updated to indicate an award amount for the play of the navigation game in response to determining that the respective space condition of the target space comprises a win condition.

The method can include a health score with a predetermined value. The method can include determining that the respective space condition of at least one space within a row or a column is a predetermined decrement condition that causes the game state to be updated to decrement the health score of the play.

The method can include determining that the respective space condition causes the game state to accept additional input to navigate to a second row or a second column of the plurality of rows or columns.

The method can include generating a respective score for each row or column based on the respective space condition of each space of the plurality of rows or columns.

The method can include causing the graphical user interface to include an interactive element that, when interacted with, causes the one or more processors to update a credit balance based on the position of the icon in the plurality of rows or columns.

The method can include determining, based on the game state, that the icon has been navigated to a final row or a final column of the plurality of rows or columns and adjusting a credit balance based on a bonus amount in response to determining that the icon has been navigated to the final row or the final column.

At least one aspect of the present disclosure is directed to a bonus selection gaming system. The gaming system can include one or more processors coupled to memory. The one or more processors may receive a wager for a play of a bonus selection game. Upon receiving the wager, the one or more processors may cause the presentation of a first graphical user interface that includes a set of first graphical elements representing bonus parameters for the bonus selection game and a set of second graphical elements representing multiplier parameters. The one or more processors may update the first graphical user interface to indicate selections of the respective bonus parameter of a first graphical element of the set of first graphical elements and the respective multiplier parameter of a second graphical element of the set of second graphical elements. The one or more processors may execute, in a second graphical user interface, the play of the bonus selection game according to the respective bonus parameter of the first graphical element. The one or more processors may adjust a credit balance based on the respective multiplier parameter of the second graphical element and an outcome of the play of the bonus selection game.

In some implementations, the one or more processors may cause the second graphical user interface to present a plurality of rows or columns for the play of the bonus selection game. Each row or column can include its own set of spaces, and each space can correspond to a respective space condition.

In some implementations, the one or more processors may cause the second graphical user interface to navigate an icon to a target space of the respective set of spaces of a first row or a first column of the plurality of rows or columns in response to receiving an interaction with an interactive element configured to initiate navigation of the icon.

In some implementations, the one or more processors may, in response to the respective bonus parameter of the first graphical element satisfying a bonus condition, cause the presentation of a third graphical element in the second graphical user interface. The one or more processors may receive an interaction with the third graphical element and modify a visual representation of a selected space in response to determining that the respective space condition of the selected space includes a termination condition.

In some implementations, the one or more processors may determine that the respective space condition causes a bonus selection game state to accept additional input to navigate to a second row or a second column of the plurality of rows or columns.

In some implementations, the one or more processors may cause the second graphical user interface to present an interactive element in response to the respective bonus parameter of the first graphical element indicating an interactive bonus. The interactive element, when interacted with, can cause the one or more processors to present a respective space condition of at least one space of the respective set of spaces of at least one row or column of the plurality of rows or columns.

In some implementations, the one or more processors may receive a selection of the at least one space of the respective set of spaces of the at least one row or column of the plurality of rows or columns. The selection can cause the presentation of the respective space condition of the at least one space.

In some implementations, the one or more processors may determine that the outcome of the play of the bonus selection game results in a win responsive to the respective bonus parameter of the first graphical element, indicating an instantaneous win.

In some implementations, the one or more processors may adjust the credit balance by multiplying an award amount of the outcome of the play by the respective multiplier parameter of the second graphical element.

In some implementations, the one or more processors may cause the second graphical user interface to transition to the first graphical user interface in response to the termination of the bonus selection game. The first graphical user interface can further include an interactive element that, when interacted with, causes the one or more processors to receive a second wager for a second play of the bonus selection game.

At least one aspect of the present disclosure is directed to a method of a bonus selection gaming system. The method can include receiving a wager for a play of a bonus selection game. Upon receiving the wager, the method can include causing the presentation of a first graphical user interface that includes a set of first graphical elements representing bonus parameters for the bonus selection game and a set of second graphical elements representing multiplier parameters. The method can include updating the first graphical user interface to indicate selections of the respective bonus parameter of a first graphical element of the set of first graphical elements and the respective multiplier parameter of a second graphical element of the set of second graphical elements. The method can include executing, in a second graphical user interface, the play of the bonus selection game according to the respective bonus parameter of the first graphical element. The method can include adjusting a credit balance based on the respective multiplier parameter of the second graphical element and an outcome of the play of the bonus selection game.

The method can include causing the second graphical user interface to present a plurality of rows or columns for the play of the bonus selection game. Each row or column can include its own set of spaces, and each space can correspond to a respective space condition.

The method can include causing the second graphical user interface to navigate an icon to a target space of the respective set of spaces of a first row or a first column of the plurality of rows or columns in response to receiving an interaction with an interactive element configured to initiate navigation of the icon.

The method can include, in response to the respective bonus parameter of the first graphical element satisfying a bonus condition, causing the presentation of a third graphical element in the second graphical user interface. The method can include receiving an interaction with the third graphical element and modifying a visual representation of a selected space in response to determining that the respective space condition of the selected space includes a termination condition.

The method can include determining that the respective space condition causes a bonus selection game state to accept additional input to navigate to a second row or a second column of the plurality of rows or columns.

The method can include causing the second graphical user interface to present an interactive element in response to the respective bonus parameter of the first graphical element indicating an interactive bonus. The interactive element, when interacted with, can cause the one or more processors to present a respective space condition of at least one space of the respective set of spaces of at least one row or column of the plurality of rows or columns.

The method can include receiving a selection of the at least one space of the respective set of spaces of the at least one row or column of the plurality of rows or columns. The selection can cause the presentation of the respective space condition of the at least one space.

The method can include determining that the outcome of the play of the bonus selection game results in a win responsive to the respective bonus parameter of the first graphical element, indicating an instantaneous win.

The method can include adjusting the credit balance by multiplying an award amount of the outcome of the play by the respective multiplier parameter of the second graphical element.

The method can include causing the second graphical user interface to transition to the first graphical user interface in response to the termination of the bonus selection game. The first graphical user interface can further include an interactive element that, when interacted with, causes the one or more processors to receive a second wager for a second play of the bonus selection game.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations and are incorporated in and constitute a part of this specification. Aspects can be combined, and it will be readily appreciated that features described in the context of one aspect of the invention can be combined with other aspects. Aspects can be implemented in any convenient form. For example, by appropriate computer programs, which may be carried on appropriate carrier media (e.g., computer readable media), which may be tangible carrier media (e.g., disks) or intangible carrier media (e.g., communications signals). Aspects may also be implemented using suitable apparatuses, which may take the form of programmable computers running computer programs arranged to implement the aspect. As used in the specification and in the claims, the singular form of "a", "an", and "the" include plural referents unless the context clearly dictates otherwise.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

Below are detailed descriptions of various concepts related to, and implementations of, techniques, approaches, methods, apparatuses, and systems for providing interactive game experiences. The various concepts introduced above and discussed in greater detail below may be implemented in any of numerous ways, as the described concepts are not limited to any particular manner of implementation. Examples of specific implementations and applications are provided primarily for illustrative purposes.

The systems and methods described herein provide techniques for implementing interactive gaming content, including implementations of a navigation game where players can navigate an icon through multiple rows or columns. Each row or column can include a set of spaces with respective space conditions that update the game state. The spaces in each row or column can be randomly generated to provide opportunities for awards, bonuses, or other in-game events, the systems and methods of this technical solution provide a technical improvement to player engagement devices by providing additional engagement features not utilized in conventional gaming systems, in particular, providing additional bonus award opportunities via graphical user interfaces displayed on the screen.

For purposes of reading the description of the various implementations below, the following descriptions of the sections of the Specification and their respective contents may be helpful:

- Section A describes a remote or local computing environment that may be useful for implementing the various interactive games described herein;
- Section B describes systems and methods directed towards the Navigation game;
- Section C describes systems and methods directed towards the bonus selection game; and
- Section D describes a computing and networking environment that may be useful for practicing the implementations described herein.

A. Remote and Local Computing Environment for Interactive Games

The techniques described herein include features and functionalities to enhance the player experience in interactive games. These features may include but are not limited to gameplay mechanics, visual and audio elements, intuitive user interfaces, dynamic game environments, and reward systems. The techniques can be applied to various game genres such as action, adventure, strategy, cards, puzzles, random selection or random number games, slot machine games, navigation games, simulation games, and more. Moreover, the techniques discussed herein allow for the integration of multiplayer capabilities to allow players to engage in collaborative or competitive gameplay experiences with others across various platforms.

Figure 1A:
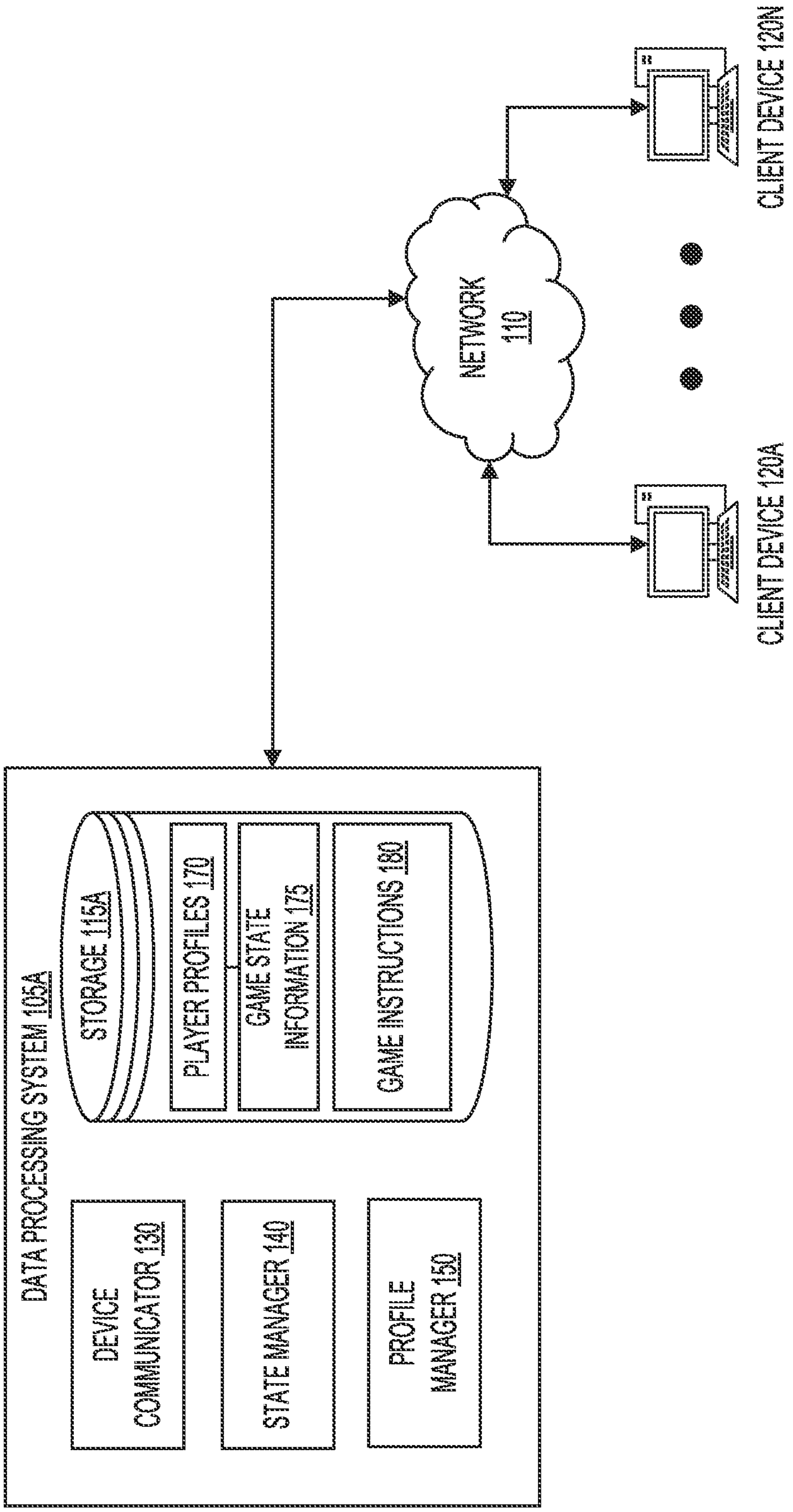
FIG. 1A illustrates a block diagram of an example system for providing gaming system functionalities in a client-server configuration, in accordance with one or more implementations.

Referring to FIG. 1A, depicted is a block diagram of an example system 100A for providing gaming system functionalities, in accordance with one or more implementations. In FIG. 1A, the system 100A can include at least one data processing system 105A, at least one network 110, and one or more client devices 120A-120N (sometimes generally referred to as client device(s) 120).

In FIG. 1A, the data processing system 105A can include at least one device communicator 130, at least one state manager 140, at least one profile manager 150, and at least one storage 115A. The storage 115A can include one or more player profiles 170, game state information 175, and one or more game instructions 180.

Figure 6:
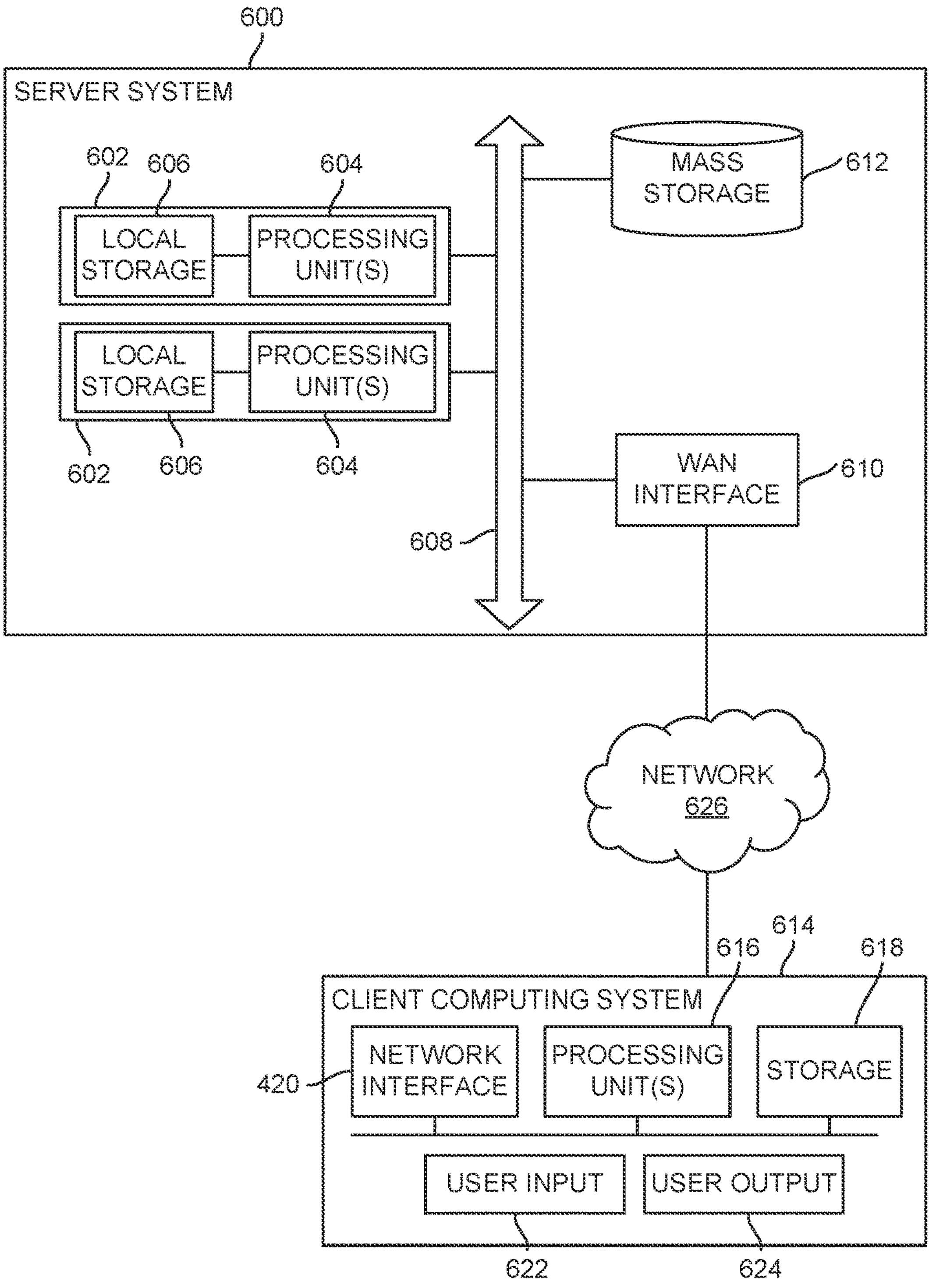
FIG. 6 illustrates a block diagram of a server system and a client computer system in accordance with an illustrative implementation.

Each of the components (e.g., the data processing system 105A, the network 110, the client devices 120, etc.) of the system 100A can be implemented using the hardware components or a combination of software with the hardware components of a computing system, such as the server 600 or the client computing system 614 described in connection with FIG. 6, or any other computing system described herein.

The data processing system 105A can include at least one processor and a memory, e.g., a processing circuit. The memory can store processor-executable instructions that, when executed by processor, cause the processor to perform one or more of the operations described herein. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The data processing system 105A can include one or more computing devices or servers that can perform various functions as described herein. The data processing system 105A can include any or all of the components and perform any or all of the functions of a server system 600 described herein in conjunction with FIG. 6.

The network 110 can include computer networks such as the Internet, local, wide, metro or other area networks, intranets, satellite networks, other computer networks such as voice or data mobile phone communication networks, and combinations thereof. The data processing system 105A of the system 100A can communicate via the network 110, for example with one or more client devices 120. The network 110 may be any form of computer network that can relay information between the data processing system 105A, the one or more client devices 120, and one or more information sources, such as web servers or external databases, amongst others. In some implementations, the network 110 may include the Internet and/or other types of data networks, such as a local area network (LAN), a wide area network (WAN), a cellular network, a satellite network, or other types of data networks.

The network 110 may also include any number of computing devices (e.g., computers, servers, routers, network switches, etc.) that are configured to receive and/or transmit data within the network 110. The network 110 may further include any number of hardwired and/or wireless connections. Any or all of the computing devices described herein (e.g., the data processing system 105A, the one or more client devices 120, the server system 600, the client computing system 614, etc.) may communicate wirelessly (e.g., via WiFi, cellular, radio, etc.) with a transceiver that is hardwired (e.g., via a fiber optic cable, a CAT5 cable, etc.) to other computing devices in the network 110. Any or all of the computing devices described herein (e.g., the data processing system 105A, the one or more client devices 120, the server system 600, the client computing system 614, etc.) may also communicate wirelessly with the computing devices of the network 110 via a proxy device (e.g., a router, network switch, or gateway).

Each of the client devices 120 can include at least one processor and a memory, e.g., a processing circuit. The memory can store processor-executable instructions that, when executed by processor, cause the processor to perform one or more of the operations described herein. The processor can include a microprocessor, an ASIC, an FPGA, etc., or combinations thereof. The memory can include, but is not limited to, electronic, optical, magnetic, or any other storage or transmission device capable of providing the processor with program instructions. The memory can further include a floppy disk, CD-ROM, DVD, magnetic disk, memory chip, ASIC, FPGA, ROM, RAM, EEPROM, EPROM, flash memory, optical media, or any other suitable memory from which the processor can read instructions. The instructions can include code from any suitable computer programming language. The client devices 120 can include one or more computing devices or servers that can perform various functions as described herein. The one or more client devices 120 can include any or all of the components and perform any or all of the functions of the client computing system 614 described herein in conjunction with FIG. 6.

Each client device 120 can include, but is not limited to, a mobile device (e.g., a smartphone, tablet, etc.), a television device (e.g., smart television, set-top box, et.), a personal computing device (e.g., a desktop, a laptop, etc.) or another type of computing device. Each client device 120 can be implemented using hardware or a combination of software and hardware. Each client device 120 can include a display or display portion. The display can include a display portion of a television, a display portion of a computing device, or another type of interactive display (e.g., a touchscreen, a display, etc.) and one or more input/output (I/O) devices (e.g., a mouse, a keyboard, digital keypad). The display can include one or more portions, for example, to display multiple in-game events as described herein. The display can include a touch screen displaying an application, such as the gaming applications described herein. The display can include a border region (e.g., side border, top border, bottom border).

In some implementations, the display can include a touch screen display, which can receive interactions from a player.

The interactions can result in interaction data, which can be stored and transmitted by the processing circuitry of the client device 120. The interaction data can include, for example, interaction coordinates, an interaction type (e.g., click, swipe, scroll, tap, etc.), and an indication of an actionable object with which the interaction occurred. Each client device 120 can include an input device that enables a player to interact with and/or select one or more actionable objects as described herein. For example, a touchscreen display can enable interaction with one or more visual indications provided through the display of each client device 120, and responsive to an interaction (e.g., select, click-on, touch, hover), the client device 120 can generate an indication identifying a player input and/or selection of a wager, an in-game event, or an indication to participate in a bonus event, among others.

Each client device 120 can include a device identifier, which can be specific to each respective client device 120. The device identifier can include a script, code, label, or marker that identifies a particular client device 120. In some implementations, the device identifier can include a string or plurality of numbers, letters, characters or any combination numbers, letters, and characters. In some implementations, each client device 120 can have a unique device identifier. Each client device 120 can include a client application, which can be a gaming application that communicates with the data processing system 105A to play games, as described herein. The client application can include an application executing on each client device 120 or provided to the client device 120 by the gaming system.

The application can include a web application, a server application, a resource, a desktop, or a file. In some implementations, the application can include a local application (e.g., local to a client device 120), hosted application, Software as a Service (SaaS) application, virtual application, mobile application, and other forms of content. In some implementations, the application can include or correspond to applications provided by remote servers or third-party servers. In some implementations, the application can access the player profiles 170, the game state information 175, or the game instructions 180, stored and maintained at the storage 115A, and generate one or more actionable objects, such as the actionable objects described herein below in connection with FIGS. 2A-2D and FIGS. 4A-4D, for a player through a client device 120. Such actionable objects can include player-selectable hyperlinks, buttons, graphics, videos, images, or other application features that generate a signal that is processed by the application executing on the respective client device 120.

In some implementations, one or more client devices 120 can establish one or more communication sessions with the data processing system 105A. The one or more communication sessions can each include a channel or connection between the data processing system 105A and the one or more client devices 120. The one or more communication systems can each include an application session (e.g., virtual application), an execution session, a desktop session, a hosted desktop session, a terminal services session, a browser session, a remote desktop session, a URL session and/or a remote application session. Each communication session can include encrypted and/or secure sessions, which can include an encrypted file, encrypted data or traffic. The client devices 120 can each use the communication session established with the data processing system 105A to carry out any of the functionalities described herein. For example, the application executing on a client device 120 can perform any of the client-side operations described herein, including displaying any of the user interfaces shown in FIGS. 2A-2D and FIGS. 4A-4D, or any other types of user interfaces described herein.

Each of the client devices 120 can be computing devices configured to communicate via the network 110 to access information resources, such as web pages via a web browser, or application resources via a native application executing on a client device 120. When accessing information resources, the client device can execute instructions (e.g., embedded in the native applications, in the information resources, etc.) that cause the client devices to display gaming application interfaces, such as the user interface described herein below in conjunction with FIGS. 2A-2D and FIGS. 4A-4D. The gaming application interfaces can be, for example, application interfaces that present different types of casino games, or other types of interactive video games. In general, video games include content (e.g., images, video, animations, graphics, audio, etc.) that is presented to a player via the input/output interfaces of a client device 120.

In response to interaction with user interface elements, the client devices 120 can transmit information, such as player profile information (e.g., changing player profile parameters, changing login information, any information stored in a player profile 170, etc.), interaction information, selections of wager amounts, selections of gaming participation events, or other signals to the data processing system 105A. In some implementations, a client device 120 can transmit a request to initiate a gaming session, and requests for additional gameplay features during a gaming session. The request can include, for example, a request to play a particular game (e.g., can include a game identifier, etc.). The request can be a hypertext transfer protocol (HTTP or HTTPS) request message, a file transfer protocol message, an email message, a text message, or any other type of message that can be transmitted via the network 110.

The data processing system 105A is shown as including the storage 115A. The storage 115A can be a computer-readable memory that can store or maintain any of the information described herein. The storage 115A can maintain one or more data structures, which may contain, index, or otherwise store each of the values, pluralities, sets, variables, vectors, numbers, or thresholds described herein. The storage 115A can be accessed using one or more memory addresses, index values, or identifiers of any item, structure, or region maintained in the storage 115A. The storage 115A can be accessed by the components of the data processing system 105A, or any other computing device described herein, via the network 110. In some implementations, the storage 115A can be internal to the data processing system 105A. In some implementations, the storage 115A can exist external to the data processing system 105A and may be accessed via the network 110. For example, the storage 115A may be distributed across many different computer systems (e.g., a cloud computing system) or storage elements and may be accessed via the network 110 or a suitable computer bus interface.

The data processing system 105A can store, in one or more regions of the memory of the data processing system 105A, or in the storage 115A, the results of any or all computations, determinations, selections, identifications, generations, constructions, or calculations in one or more data structures indexed or identified with appropriate values. Any or all values stored in the storage 115A may be accessed by any computing device described herein, such as the data processing system 105A, to perform any of the functionalities or functions described herein. In implementations where the storage 115A forms a part of a cloud computing system, the storage 115A can be a distributed storage medium in a cloud computing system and can be accessed by any of the components of the data processing system 105A, by the one or more client devices 120 (e.g., via the user interface similar to that depicted in FIGS. 2A-2D and FIGS. 4A-4D, etc.), or any other computing devices described herein.

The storage 115A can store one or more player profiles 170 associated with a user (referred to herein as a "player") of a client device 120. A player profile 170 of a player can be a user profile that includes information about the player and information about one or more of the client devices 120 used to access the data processing system 105A using the player profile 170. For example, identifiers of the player profile 170 can be used to access the functionality of the data processing system 105A (e.g., by logging into the data processing system 105A via one or more web-based interfaces). The identifiers can include a username, a password, an e-mail address, a phone number, a personal identification number (PIN), a secret code-word, device identifiers for use in a two-factor authentication technique, among others. The player profile 170 can store information about wagers, games, and gaming events that are performed by the player via the data processing system 105A. The player profile 170 can store a credit balance, wager information or side wager information (e.g., an amount of a wager/side wager, a timestamp associated with a wager/side wager, information about gaming conditions or game state information that resulted in a side wager, a client device identifier of a client device that was used to place the wager/side wager, etc.). The player profile 170 can store information about a client device used to access the data processing system 105A such as an IP address, a MAC address, a GUID, a player profile name (e.g., the name of a user of the client device 120, etc.), device name, among others. In some implementations, the player profile 170 can be created by the data processing system 105A in response to the player profile creation request transmitted by a client device 120. The player profile creation request can include any of the player profile information described herein.

The storage 115A can store or maintain game state information 175 associated with each of the one or more player profiles 170, for example, in one or more data structures. The game state information 175 can include information for games previously or currently played or otherwise accessed by a client device 120 using a corresponding player profile 170. In some implementations, a client device 120 accessing the data processing system 105A may not be associated with a player profile 170. In such implementations, the data processing system 105A can automatically create a player profile 170 using an identifier of the client device 120 provided by the client device 120. The game state information 175 can include information about previous wagers, side wagers, hands, actions, interactions, or other data provided by the client device 120 during the play of a game provided by the data processing system 105A. As described in further detail herein, the state manager 140 can maintain (e.g., store, update, etc.), in corresponding game stat information 175, a respective game state of games as they are being played for multiple players accessing the data processing system 105A. The game state information 175 can include one or more data structures that include any information related to a game state, such as current cards held by a player (e.g., in a blackjack game, poker game, or another card game, etc.), wager information, information about whether the player has indicated a desire to participate in additional bonus award opportunities, or other game state data described herein.

The game state information 175 can include turn information (e.g., which user has the current turn, how many game turns have elapsed, etc.) for one or more games provided via the data processing system 105A. In some implementations, information used to update the game state information 175 can be received as a play of the game occurs (e.g., as the play is processed by the data processing system 105A according to the game instructions, etc.). The game state information 175 can include options that a player may take at each portion of a game, and any actions (e.g., interactions, pausing/waiting for a particular duration at stored timestamps, etc.) the client device 120 takes in response to said options. In some implementations, if multiple hands are being controlled by a player via the client device 120 for a single play of a card game (e.g., multiple hands for a single round of blackjack, poker, or another card game, etc.), the game state information 175 can include game state information for each of the hands under control of the player. In addition, the game state information 175 can include information relating to the conditions of additional wagers.

In some implementations, the game state information 175 can include relevant information about the configuration of multiple rows or columns in a navigation game. Each row or column can have a set of spaces, and the game state information 175 may include information about the randomly generated spaces. The game state information 175 can also include the player's selection of a target space to hop onto as well as the player's position within the multiple rows or columns as they progress from one row or column to the next. Furthermore, the game state information 175 can include the respective space conditions of each space, such as whether the respective space condition is a termination condition, a win condition, a health decrement condition, or a bonus condition.

In some implementations, in addition to the configuration details of the rows or columns mentioned above, the game state information 175 can include information about the outcomes of a set of first graphical elements, which correspond to specific bonus parameters, and a set of second graphical elements, which correspond to specific multiplier parameters, in a bonus selection game. The game state information 175 can include the update of the first graphical user interface according to the first and second graphical elements. Furthermore, the game state information 175 can specify the player's navigation through the multiple rows or columns based on the set of first graphical elements and the result of each target space encounter, indicating whether it resulted in an instant win or loss.

The storage 115A can store or maintain game instructions 180. The game instructions 180 can include instructions to play various games (e.g., navigation games). The game instructions 180 can specify one or more game events that occur in response to a particular game state. The game instructions can include instructions to play a game from start to finish, for example, by streaming gaming content to each of the client devices 120 that initiate play of a particular game, or by executing the game instructions and displaying content via a local display device. The game instructions 180 can be stored in one or more data structures that are indexed by a game name (e.g., blackjack, poker, rummy, craps, sic bo, Klondike, or any other game, etc.). The game instructions 180 can be processor executable instructions that cause the data processing system 105A to provide one or more games to a client device 120 via a communication session.

In some implementations, the game instructions 180 can include artificial intelligence models (e.g., machine learning models, neural network, decision trees, ruled-based lookup table, etc.) that cause the data processing system 105A to play an opposing entity to a player of one of the games in the game instructions 180. For example, the artificial intelligence model can provide a simulated dealer in a blackjack game, a simulated player in a poker game, or other simulated players, dealers, or game entities. In some implementations, the game instructions 180 can include game instructions that allow a play of a game to progress with multiple hands. For example, in a multi-hand card game, the game instructions 180 can include instructions that accommodate multiple hands being controlled by a single player.

The game instructions 180 can include, or may include instructions for generating, odds information, which can be stored as probability values of certain in-game events occurring. The odds information may further define one or more probability distributions that may be sampled to determine an outcome of one or more events in the game, according to the game instructions 180. In some implementations, the odds information may be altered based on actions taken by the player, or the odds information can correspond to the likelihood of one or more outcomes (e.g., an expected value of player loss, an expected value of player win, etc.). For example, in the navigation games described herein, the odds may define whether a space in a row or column is a safe target space, and therefore may define the probability of landing on a "safe" space within a given row or column. A pay table for the navigation games can specify awards, if any, associated with different space conditions, and the odds information provides the underlying probabilities for those space conditions in some implementations.

The game instructions 180 can also cause the game state information 175 for a game to be updated as the game is played via a client device 120. For example, in some implementations, the game instructions can update the odds information in response to an indication (e.g., as stored in the game state information 175, etc.) to participate in an additional bonus opportunity, such as a bonus play of the game, a separate bonus game, or a side wager or insurance bet that may result in an additional or alternative award.

In some implementations where the game instructions 180 provide instructions for a game that implements a side wager, the game instructions 180 can specify the conditions under which the player is able to place the side wager, the conditions under which the player is to be awarded with awards according to a side wager when a corresponding side wager condition is met (e.g., at game termination, on player win, on player loss, etc.). Each of the components of the data processing system 105A can access, update, or modify the player profiles 170, the game state information 175, or the game instructions 180, to carry out functionalities.

In some implementations, the game instructions 180 can provide instructions for a navigation game. In a brief overview of example game instructions 180, upon receiving a wager from a player, the data processing system 105A can cause the presentation of a graphical user interface having multiple rows or columns. Each row or column consists of spaces, and each space corresponds to a respective space condition. The space conditions can include, but are not limited to, a termination condition, a win condition, a bonus condition, and a safe space. The space conditions for each space may be concealed from a player until an icon is navigated to the space. A player can provide input to navigate an icon from a starting position to a selected space within a row or column that is proximate to the icon. The data processing system 105A can then reveal the space condition of a space to which the icon is navigated and update the game state information 175 according to the space condition and the game instructions 180.

To determine the outcome of the navigation game, the data processing system 105A can determine whether the player has elected to cash-out of the game (e.g., via interaction with a corresponding user interface element), or whether the icon has been successfully navigated to the final row or column. In some implementations, if the icon has been successfully navigated to the final row or column, a win or bonus condition can be satisfied. In response to a winning outcome, the data processing system 105A can adjust the credit balance by adding a reward amount or a bonus amount to the original wager.

If the icon navigates to a target space within the multiple rows or columns corresponding to a termination condition (described in further detail herein), the data processing system 105A can terminate the play of the game and adjust the credit balance accordingly. In some implementations, if a target space corresponds to a safe space (e.g., not having a space condition resulting in a win or termination of the game), the data processing system 105A can monitor further inputs from the player to navigate the icon to further rows or columns. The data processing system 105A can dynamically update the graphical user interface to reflect the movements of the icon and any changes in the game state information 175, as described in further detail herein.

In some implementations, the game instructions 180 can provide instructions for a bonus selection game. In a brief overview of example game instructions 180, upon receiving a wager from a player, the data processing system 105A can cause presentation of a first graphical user interface that presents sets of first and second graphical elements, which may be utilized to indicate bonuses that are applied to a navigation-based game. The first set of graphical elements can correspond to a set of bonus parameters, and the second set of graphical elements can correspond to multiplier parameters, in some implementations. The first graphical user interface may be displayed prior to any type of game that may implement the bonus parameter(s) and/or multiplier parameter(s) selected according to the techniques described herein.

The data processing system can update the first graphical user interface with selections of the respective graphical elements (e.g., at least one bonus parameter, at least one multiplier parameter, etc.), and execute the play of the game in a second graphical user interface. In some implementations, the game may be a navigation game, and the second graphical user interface can present multiple rows or columns for the navigation game. Each row or column includes spaces, and each space corresponds to a respective space condition. The space condition can include a termination condition, which when revealed, causes the data processing system 105A to end the play of the game. The spaces may include safe spaces, to which the icon can be navigated without causing the game to be terminated. When positioned in such a space, the data processing system 105A can receive additional inputs to navigate the icon to further spaces in a next row or column. The data processing system 105A can carry out the play of the game according to the bonus parameters selected at the first graphical user interface and can adjust the credit balance by award amounts calculated using the multiplier value(s) selected at the first graphical user interface upon successfully navigating the icon to a final row or column.

Referring now to the operations of the data processing system 105A, the device communicator 130 can establish a game session with a client device in response to a request from a client device. Establishing the game session may include generating game state information 175 for the player profile 170 used to access the data processing system 105A to initiate the play of the game. The request to establish a game session may include a request to play a game, which may be received in one or more messages from an application executing on the client device 120. The message, or request, can indicate that a player intends to play a game provided by the data processing system 105A. The message can include an indication of a player profile 170 with which to use for the functionalities related to the game (e.g., placing wagers using earned credits, purchasing additional credits, etc.).

The message can include an identifier of a particular game to play. In some implementations, the device communicator 130 can provide the client device 120 with instructions to display one or more games to play in a list, allowing the player to select a game from the list. In response to an interaction indicating a selection, the client device 120 can transmit a signal identifying a game to the data processing system 105A. Using the game selection, the data processing system 105A can communicate a user interface for the game generated according to the game instructions 180 for the game and the game state information 175 for the game session. Such graphical user interfaces are shown in FIGS. 2A-2D and FIGS. 4A-4D. The selected game can be, for example, a navigation game, which can include (but is not limited to) games that involve guiding or navigating a character or object across rows or columns including spaces.

A play of a game can be a single "round" or play-through of a game to a termination condition (e.g., a condition after which the player has won or lost the wagers for a single instance of the game, etc.). To initiate a play of the game, or during a play of the game, the device communicator 130 can receive one or more wagers from the client device 120 (e.g., in response to corresponding user interface elements presented at the client device 120, as described herein). The wager(s) may specify a wager amount. The wager amount provided by the client device 120 can be a specified amount of credits, such as 1, 5, 25, 100, 500, or 1000 credits. In some implementations, the player can specify a custom number or fractional number of credits used in the game, each of which may correspond to a respective condition, outcome, or aspect of the game. In some implementations, the wagers may include side wagers, additional wagers, or other wagers placed prior to or during a play of the game.

The client device 120 (or an application executing on the client device 120) can receive data relating to the requested game from the device communicator 130. The data relating to the requested game can include or may be generated based on game state information 175, which can be maintained by the state manager 140, as described herein. The device communicator 130 may determine updated information to provide to the client device 120 based on the game state information 175 for the game, which is initialized and updated by the state manager 140.

The state manager 140 can update and maintain the game state information 175. The game state information 175 may refer to the current state of a game, which includes various information such as the player's current position within the multiple rows or columns, the outcomes determined based on the navigation of the icon within the multiple rows or columns, and the outcome of previous rounds. The state manager 140 can update the game state information 175 based on several factors, including player interactions, space conditions, and the game instructions 180. For example, as the player interacts with the graphical user interface and navigates the icon to different spaces in the rows or columns described herein, the state manager 140 captures and records these actions in the game state information 175. In some implementations, the state manager 140 can maintain and update the game state information 175 with the selection of bonus and multiplier parameters. This information can be used to update the game state information 175 to reflect the changes made to the graphical user interface and to adjust the player's credit balance based on the outcome of the game.

The profile manager 150 can create, modify, or delete player profiles 170 stored within storage 115A. The profile manager 150 can store and organize player information, including account details, preferences, and gaming history, among others. The profile manager 150 can generate profile information based on data received from the client devices 120. This allows the profile manager 150 to capture activity across different gaming applications and different devices, and store records of that activity in the player profile 170. The profile manager 150 can provide gaming statistics (e.g., historical game outcomes), and game progress to a requesting client device 120.

The profile manager 150 can update credit balances, game statistics, and other relevant information based on the outcomes of games played by a client device 120. The profile manager 150 receives data about game results from the client devices 120 and uses this information to make necessary adjustments to the player profile 170. For example, if a player wins a navigation game with a $10 wager, the profile manager 150 would increase their credit balance by the corresponding amount (the amount of the wager plus the win). Similarly, the profile manager 150 can record game statistics such as the number of wins, losses, and ties, as well as the player's average bet size, win percentage, and longest winning streak. This allows players to track their progress and review their gaming history. For example, a player could see that they have a 60% win rate in their navigation games and an average bet size of $10.

Figure 1B:
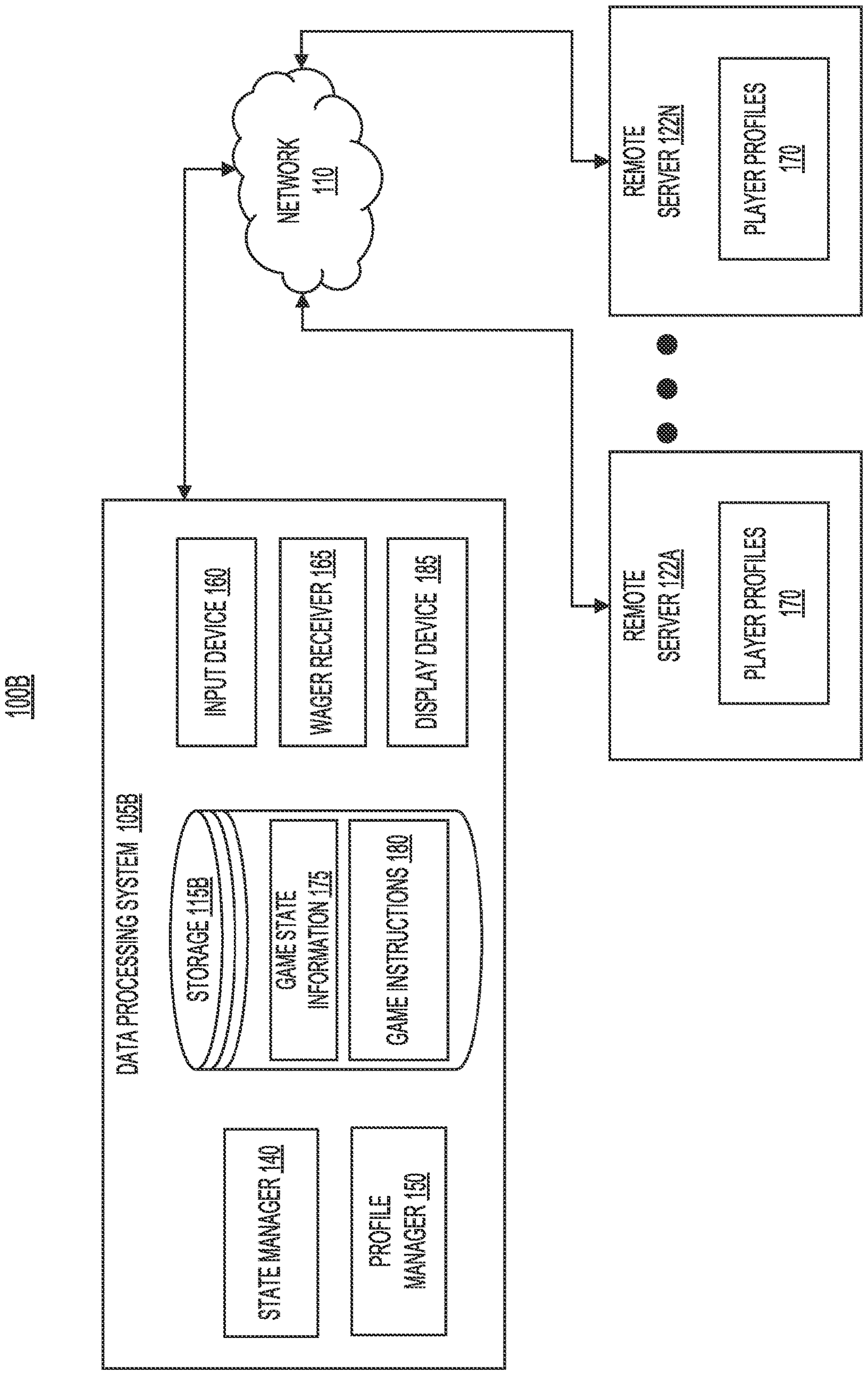
FIG. 1B illustrates a block diagram of an example system depicting a data processing system that provides gaming functionality using locally-executed game instructions, in accordance with one or more implementations.

Referring now to FIG. 1B, depicted is a block diagram of an example system 100B comprising at least one data processing system 105B, a network 110, and one or more remote servers 122A-122N (also generally referred to herein as a "remote computing system 122"). Various components of the system 100B shown in FIG. 1B may be similar to, and include any of the structure and functionality of, the system 100A of FIG. 1A. For example, the network 110 shown in FIG. 1B is similar to the network 110 in FIG. 1A, differing only in its role of facilitating the connection between the data processing system 105B and the remote computing system 122. Additionally, the components of the data processing system 105B may include some or all of the structure and functionality of their specific counterparts in FIG. 1A. For example, the data processing system 105B, similar to the implementation shown in FIG. 1A, includes a storage 115B, a state manager 140, and a profile manager 150. The data processing system 105B in FIG. 1B may further include one or more of an input device 160, a wager receiver 165, and a display device 185. The storage 115B may be similar in structure and functionality to the storage 115A and may store the game state information 175 and one or more game instructions 180.

The configuration shown in FIG. 1B may be used to implement a local gaming device, which may provide games locally without necessarily communicating with one or more remote servers 122A-122N. In one implementation, the data processing system 105B of the system 100B may implement a kiosk device, a portable gaming device, or a stationary gaming system. As shown, the data processing system 105B (or the components thereof) may communicate with one or more remote servers 122A-122N, for example, to access or update player profiles 170 maintained at the one or more remote servers 122A-122N.

The remote computing system 122 can securely store and provide access to player profiles 170 for games played on the data processing system 105B. In some implementations, the remote computing system 122 may include a file server, application server, web server, proxy server, appliance, network appliance, gateway, gateway server, virtualization server, deployment server, SSL VPN server, or firewall. The remote servers 122A-122N may store, or otherwise maintain, player profiles 170, which may be created, updated, or deleted based on communications with the data processing system 105B.

The data processing system 105B can include an input device 160, which can implement an interface between a player and the data processing system 105B. Players can interact with the input device 160 to provide commands to control the functionality of the data processing system 105B, for example, to play one or more games as described herein. In some implementations, the input device 160 can include but is not limited to one or more physical buttons (such as a slot machine arm), a keyboard, a mouse, a touchscreen, a virtual input interface, tokens, chips, or other suitable input means known in the art. Interactions provided via the input device 160 allow a player to perform graphical user interface functionality, such as navigating menus, making selections to trigger game events, entering commands, or otherwise controlling play of one or more games provided via the data processing system 105B.

The data processing system 105B includes a wager receiver 165, which can receive and process wagers made by players. The wager receiver 165 may include a coin slot where players can insert coins or tokens as part of wagers. In some implementations, the wager receiver 165 may also include a card reader that allows players to use electronic cards or tickets for placing bets. Furthermore, the wager receiver 165 may include a touchscreen, allowing players to make their wagers by directly interacting with the screen. The aforementioned examples for the wager receiver 165 are not exhaustive and may include other suitable components or technologies for receiving and processing wagers, such as near-field communication (NFC) or wireless communication with a mobile device.

The wager receiver 165 allows players to place bets or wagers for the various games provided by the data processing system 105B. Upon receiving a wager, the wager receiver 165 may provide a signal to the components of the data processing system 105B to initiate a game, initiate a play of a game, or advance a game state of the game, among other actions. In some implementations, wager receiver 165 can determine whether a received wager conforms to the game's requirements and rules (e.g., appropriate amount, type of bet, etc.). If any issues are detected, such as an invalid bet amount or an unsupported bet type, the data processing system 105B may prompt the player to revise their wager. Additionally, the data processing system 105B may check if the player has sufficient funds or credits to place the bet. The data processing system 105B reviews the player's account balance or credit balance through the profile manager 150 to make sure that they have the necessary funds available. Furthermore, the data processing system 105B applies any relevant game-specific restrictions to the wager. These restrictions can include minimum or maximum bet limits, specific betting options, or combinations.

The data processing system 105B includes a display device 185, which serves as the visual interface for players. The display device 185, integrated within the data processing system 105B, can take various forms, such as a monitor, screen, or any other suitable visual output mechanism. The display device 185 may include a touchscreen interface. Touchscreens are becoming increasingly popular as they offer a more intuitive way to interact with devices. Touchscreens may include displays that present graphical user interfaces, which may include icons, buttons, and other graphical elements that can be interacted with by touching the screen. For example, as shown in FIGS. 2A-2D and FIGS. 4A-4D, the graphical user interface can display the game graphics, interactive objects, and other relevant information that players need to interact with the data processing system 105B.

In some implementations, the data processing system 105B may transmit game-related information to the remote computing system 122 when the player requests a game or when the game state changes. This data includes game state information 175, which is managed by the state manager 140 within the data processing system 105B. Updated game state information 175 that reflects the changes occurring during the play of a game may be synchronized or otherwise provided to the remote servers 122A-122N.

The data processing system 105B can include a profile manager 150 that can provide messages to update one or more player profiles 170 stored within the remote computing system 122. The profile manager 150 can retrieve and store player-specific data, including preferences, gaming history, achievements, content they engage with, preferred wagering amounts across various games, and other relevant information, from the remote computing system 122.

As discussed above, the system 100B includes a remote computing system 122 that can store player profiles 170. The remote computing system 122 can allow the data processing system 105B, via the profile manager 150, to update player profiles 170 during or based on outcomes of games. For example, when a player interacts with the data processing system 105B, they can provide an identifier for their player profile 170 via the input device 160 or wager receiver 165. The data processing system 105B can then communicate with the remote computing system 122 to retrieve the relevant player profile information based on the identifier. The identifier of the player profile 170 could be a username, an email address, a phone number, or a social media handle, among others. Similarly, when changes occur in the player's profile, such as the outcomes of games, plays, or adjusting the credit balance of the player profile 170, etc., the profile manager 150 within the data processing system 105B updates the player profile 170. Subsequently, the data processing system 105B communicates these updates to the remote computing system 122.

B. Systems and Methods for Navigation Games

Referring now to one example implementation of a navigation game, the data processing system 105A can receive a wager and generate one or more graphical user interfaces. The graphical user interface can include one or more rows or columns, and an icon that represents the player. Each row or column can include a set of spaces. The data processing system 105A can then receive input to initiate navigation of the icon to a target space in a row or column. Each space may correspond to a specific space condition. The space conditions can include, but are not limited to, a win condition, a bonus condition, a termination condition, or a safe space. The data processing system 105A can determine the game state based on the space condition of a target space to which the icon is navigated. The data processing system 105A can update and display the updated information on the graphical user interface. Example graphical user interfaces showing an example implementation of the navigation game are shown in FIGS. 2A-2D.

Figure 2A:
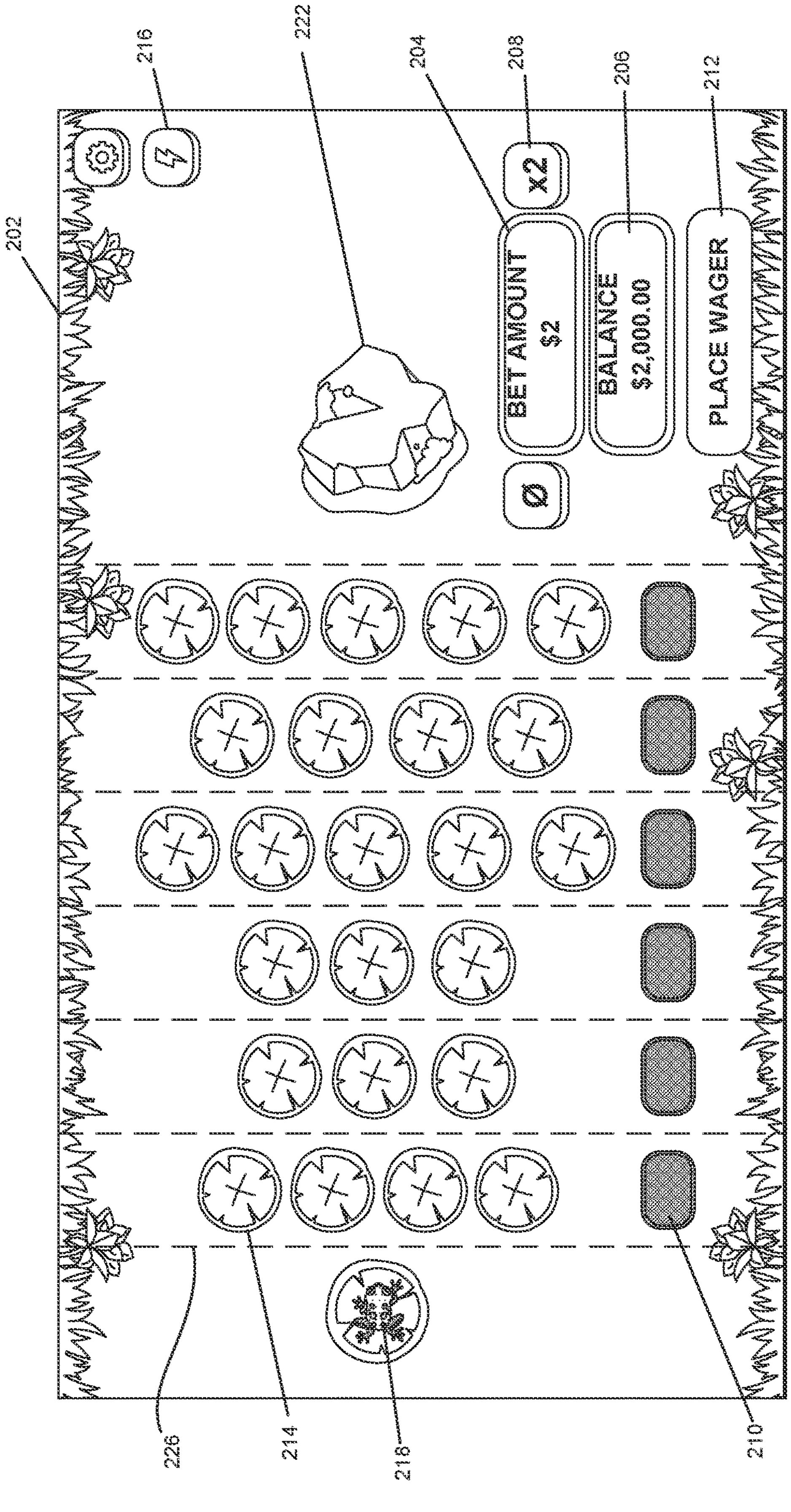
FIG. 2A illustrates a graphical user interface having multiple rows or columns for a navigation game, in accordance with one or more implementations.

Referring now to FIG. 2A in the context of the components described in connection with FIGS. 1A and 1B, a graphical user interface 202 for a navigation game is presented on a client device 120. As described herein, the device communicator 130 facilitates communication between the client device 120 and the data processing system 105A, allowing players to interact with the graphical user interface 202 and transmit their actions to the data processing system 105A. As players interact with the various interactive elements presented via graphical user interface 202, their actions, such as placing bets or initiating the game by interacting with a wager button 212, are captured and utilized to update the state of the game (e.g., in the game state information 175). The corresponding player profile 170 of the player may also be updated to reflect wager history, gameplay statistics, or credit balance changes resulting from one or more plays of the multi-hand card game.

As depicted in FIG. 2A, the graphical user interface 202 displays a visual representation of an example navigation game. The graphical user interface 202 can present a grid of multiple rows or columns with a set of interactive spaces 214. In this example, a grid with multiple columns 226 is shown. However, it should be understood that a similar graphical interface may be generated to provide rows of spaces 214, where the rows may be arranged from top to bottom (or from bottom to top) on the graphical user interface 202. A player can cause the icon 218 to navigate to particular space 214 by interacting with said space 214. In some implementations, certain spaces may be hidden or may be made non-interactive if they are not in a column 226 adjacent to the column 226 in which the icon 218 is located. The graphical user interface 202 includes several interactive buttons, including, in this example, a bet amount button 204 that enables players to specify the amount of wager they want to risk on a game. A player can interact with the bet amount button 204 and enter the amount of wager. In addition, a balance region 206 displays the amount of credits available for the player to wager on the game.

The amount shown in the balance region 206 may be determined from the credit balance specified in the player profile 170 of the player. A multiplier button 208, when interacted with, can cause the bet amount to be updated to double the value of the player's wager. The amount shown in the balance region 206 may be determined from a credit balance specified in the player profile 170 of the player. The balance region 206 may be updated in response to interactions with the bet amount button 204. Wagers made for the play of the game can be subtracted from the credit balance of the player. Any changes to the credit balance can be reflected via dynamic updates to the balance region 206.

In some implementations, the graphical user interface 202 may display a lightning bolt button 216 that can cause the data processing system 105A to alter the animation speeds in response to an interaction with the lightning bolt button 216. The lightning bolt button 216 can be toggled on or off by the player during the gameplay. The animation speeds may be modified to increase or decrease an amount of time to reveal a corresponding space condition for a target space that the player has interacted with.

Figure 2B:
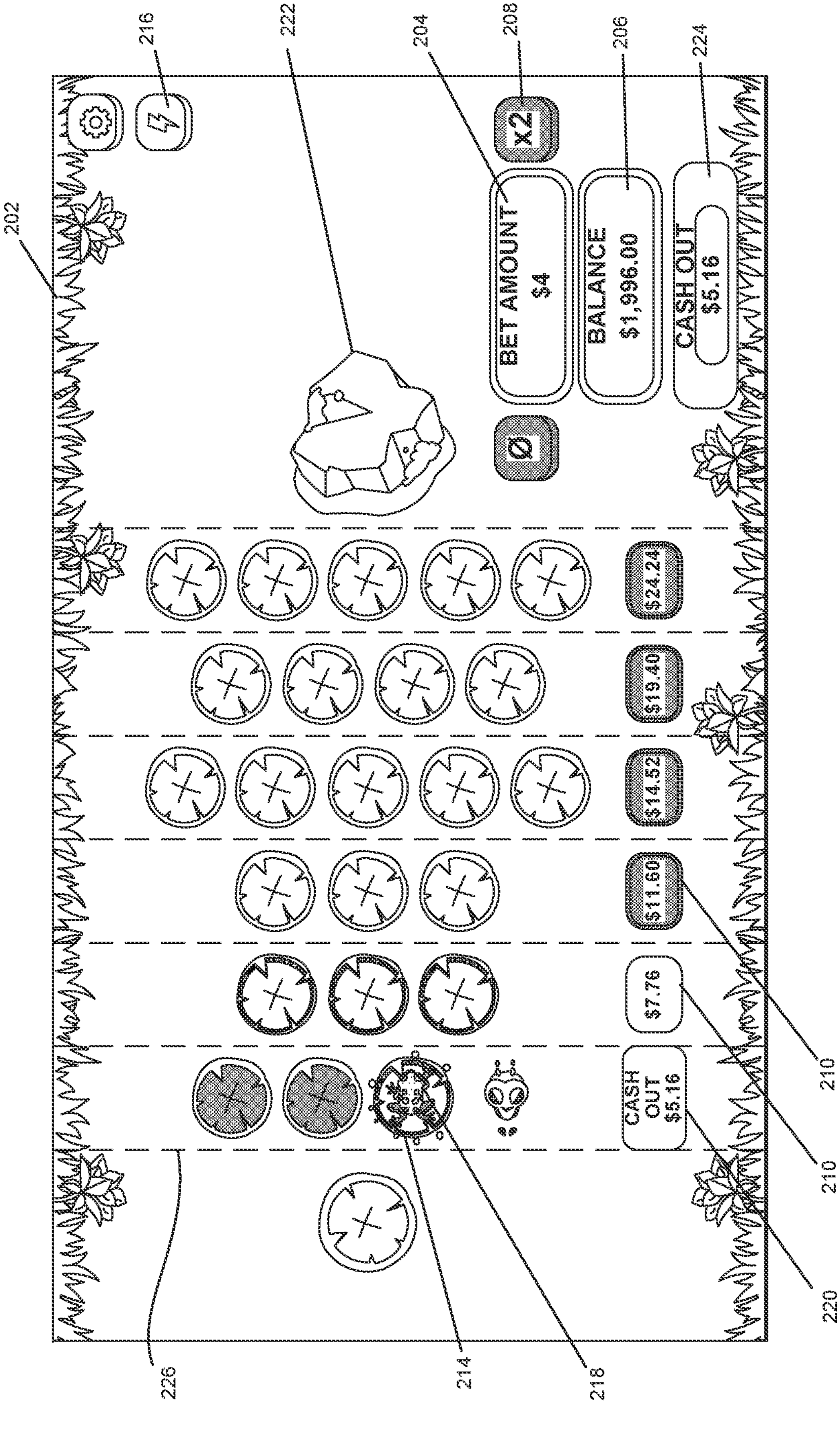
FIG. 2B illustrates a graphical user interface showing the navigation of an icon to a target space, in accordance with one or more implementations.

The graphical user interface 202, in this example, includes a rectangular space 210 under each column 226. The rectangular space 210 can indicate a respective award amount associated with each column 226. The number of rectangular spaces 210 can correspond to the number of columns 226 presented in the graphical user interface 202. The number of columns 226 may be predetermined or may be randomly determined upon placing a wager. In some implementations, the number of columns 226 (or rows, in some implementations) may be determined to be proportional to the size of the wager. As the player navigates the icon 218 across the columns 226, the number of rectangular spaces 210 may decrease, indicating the number of columns 226 that the player has completed. In some implementations, the data processing system 105A can maintain a count of the number of columns 226 that the player has successfully navigated through. This count is updated as the player navigates through the game. For example, if the player has not yet navigated through any columns 226, the data processing system 105A can maintain a count of 7 (or any number depending on the number of columns 226 generated by the data processing system 105A), as shown in FIG. 2A. When the player navigates to a first column 226 (as shown in FIG. 2B), the data processing system 105A can decrement the count by 1 (e.g., to 6). The number of rectangular spaces 210 will then be updated to 6 to reflect the fact that the player has successfully navigated through one column 226 of the game.

The number of spaces 214 in each column 226 can vary depending on the game rules or preferences, and in some implementations, the data processing system 105A can implementation a configuration where the number of spaces 214 in each column 226 is predetermined. In some implementations, the number of spaces 214 in any given column 226 may be randomly selected or determined based on the game instructions 180. For example, the number of spaces 214 in a column 226 may be selected inclusively from between two and six. Each space 214 can correspond to a respective space condition, which may also be randomly selected by the data processing system 105A. The space conditions for a column 226 may be selected such that as players navigate the icon 218 across each column 226 by interacting with different spaces 214, the data processing system 105A determines the corresponding space conditions, which leads to updates in the game state. The space conditions of the spaces 214 in each column 226 (or row, in some implementations) may be selected such that at least one "safe" space (e.g., a space that will not result in termination of the play of the game) is present in each column 226.

The space conditions may include termination, win, and bonus conditions. The termination condition is a space condition that causes the play of the game to terminate without an award. When the data processing system 105A determines that a space 214 has been navigated to, and that the space condition of that space 214 is a termination condition, the play of the game is terminated, and the game state information 175 is updated accordingly. The win condition is another space condition that causes the play of the game to terminate while providing an award to the player (e.g., updating the credit balance). When the data processing system 105A determines that an icon has been navigated to a space 214 corresponding to a win condition, the data processing system 105A can reward the player with an award amount by updating the credit balance of the player. The award amount may be reflected in the rectangular space 210 of the column 226 including the space 214 corresponding to the win condition. In some implementations, the data processing system 105A can determine that a bonus condition has been satisfied when the icon 218 has been navigated to a final space 222. The bonus condition may result in the data processing system 105A providing an additional bonus play (e.g., a free play), an additional or alternative award amount (e.g., of bonus credits), or other bonus awards.

Each space 214 (also referred to as a target space 214) within the set of spaces 214 can function as an interactive element through which the player can interact to hop an icon 218. The objective of the game is to navigate the icon 218 successfully through all the columns 226 of the game board. The icon 218 can be of any shape or form, but in the provided illustration, the icon is being displayed as a frog.

Referring now to FIG. 2B in the context of the components described in connection with FIGS. 1A and 1B, the graphical user interface 202 of FIG. 2A is shown after the player has navigated the icon 218 to a target space 214 within the first column 226. As shown, the player has navigated the icon 218 to the target space 214 in the first column 226. In response to an interaction with the space 214, the data processing system 105A can maintain the position of the icon 218 within a specific column 226, and the icon 218 can only be moved to the target space 214 that is adjacent to the current column 226. The data processing system 105A may restrict movement of the icon 218 to certain target spaces 214, such as spaces 214 within columns 226 that are not adjacent to the column 226 in which the icon 218 is positioned.

As shown in FIG. 2B, in response to the interaction with the target space 214, the data processing system 105A receives an input to move the icon 218 to the target space 214 in the first column 226. The target space 214, in this instance, corresponds to a safe space condition, causing the data processing system 105A to update the game state information 175 and display any termination conditions in that column 226 via the graphical user interface 202. As shown, once navigated to a column 226, the data processing system 105A can update the graphical user interface 202 to reveal the space condition of each space 214 in the column 226 to which the icon was navigated. If the icon 218 was navigated to a safe space, the data processing system 105A prompts the player to provide additional input to navigate the icon 218 to another space 214 in the next, adjacent column 226. In some implementations, the graphical user interface 202 is updated to display an interactive element or a button that enables the player to navigate the icon 218 to the target space 214 in the second column 226 by interacting with the interactive element or button. In some implementations, the button, when interacted with, may cause the data processing system 105A to navigate the icon 218 to a randomly selected space 214 in the next (e.g., un-navigated to and adjacent) column 226.

Upon receiving input to navigate the icon 218 to the target space 214 in the first column 226, the data processing system 105A dynamically updates the graphical user interface 202 to display a cash-out button 220 in place of the rectangular space 210 under the column 226 in which the icon 218 is currently positioned. The cash-out button 220 for the column 226 in which the icon 218 is positioned is updated to a white color. The player can interact with the cash-out button 220 to cash out the corresponding amount and terminate the game. The remaining rectangular spaces 210, corresponding to the columns 226 that the icon 218 has not navigated to, are grayed out. In some implementations, the grayed-out rectangular spaces 210 may indicate the corresponding payouts, but the cash-out button 220 is only displayed for a column 226 when the icon 218 is successfully navigated to that column 226. The color of the rectangular spaces 210 is dynamically updated by the data processing system 105A based on the player's input. For example, when the player navigates the icon 218 to a new column 226, the data processing system 105A replaces the rectangular space 210 of that column 226 with the cash-out button 220 and updates the color of the cash-out button 220 for that column 226 to white. The data processing system 105A can also update the color of the adjacent rectangular space 210 to white, as the player may decide to navigate the icon 218 to the adjacent column 226 next. Furthermore, as shown in connection with FIG. 2C, the graphical user interface 202 is updated to slightly gray out the rectangular space 210 of the previous column 226 (the first column 226) where the icon was positioned before navigating to the adjacent column 226, indicating that the icon 218 can no longer be navigated back to the previous (first) column 226. The data processing system 105A can keep track of which columns 226 the icon 218 has already navigated to and which columns 226 the icon 218 has not navigated to.

In some implementations, as shown in FIG. 2B, upon navigating the icon 218 to the first column 226, the graphical user interface 202 is dynamically updated to display a cash-out button 224 in place of the wager button 212, as shown on the bottom right of the graphical user interface 202. The player can interact with the cash-out button 224 to cash out the corresponding amount and terminate the game. As detailed herein, the player can also cash out and terminate the game by interacting with the cash-out button 220 under the column 226 in which the icon 218 is positioned. The data processing system 105A can update the player profile 170 in response to an interaction with the cash-out buttons 220, 224. Moreover, in response to the interaction with the cash-out buttons 220, 224, the data processing system 105A can reset the game state information 175 to its initial state and update the graphical user interface 202 to reflect this change. The graphical user interface 202 is updated to reset all columns 226 to their initial state.

In some implementations, the respective score of each column 226 is determined based on the number of spaces corresponding to termination condition and the difficulty level in the column 226 to compute the appropriate cash-out amount for the columns 226. For example, if the number of spaces corresponding to termination condition in a column 226 increases, the data processing system 105A may increase the cash-out amount for that column 226. However, if the difficulty level in a column 226 decreases, the data processing system 105A may decrease the cash-out amount for that column 226. In some implementations, the data processing system 105A can determine the cash-out amounts based on the position of the icon 218 in a column 226. For example, if the player has successfully navigated through a number of columns 226, the data processing system 105A may increase the cash-out amount for subsequent columns 226.

Figure 2C:
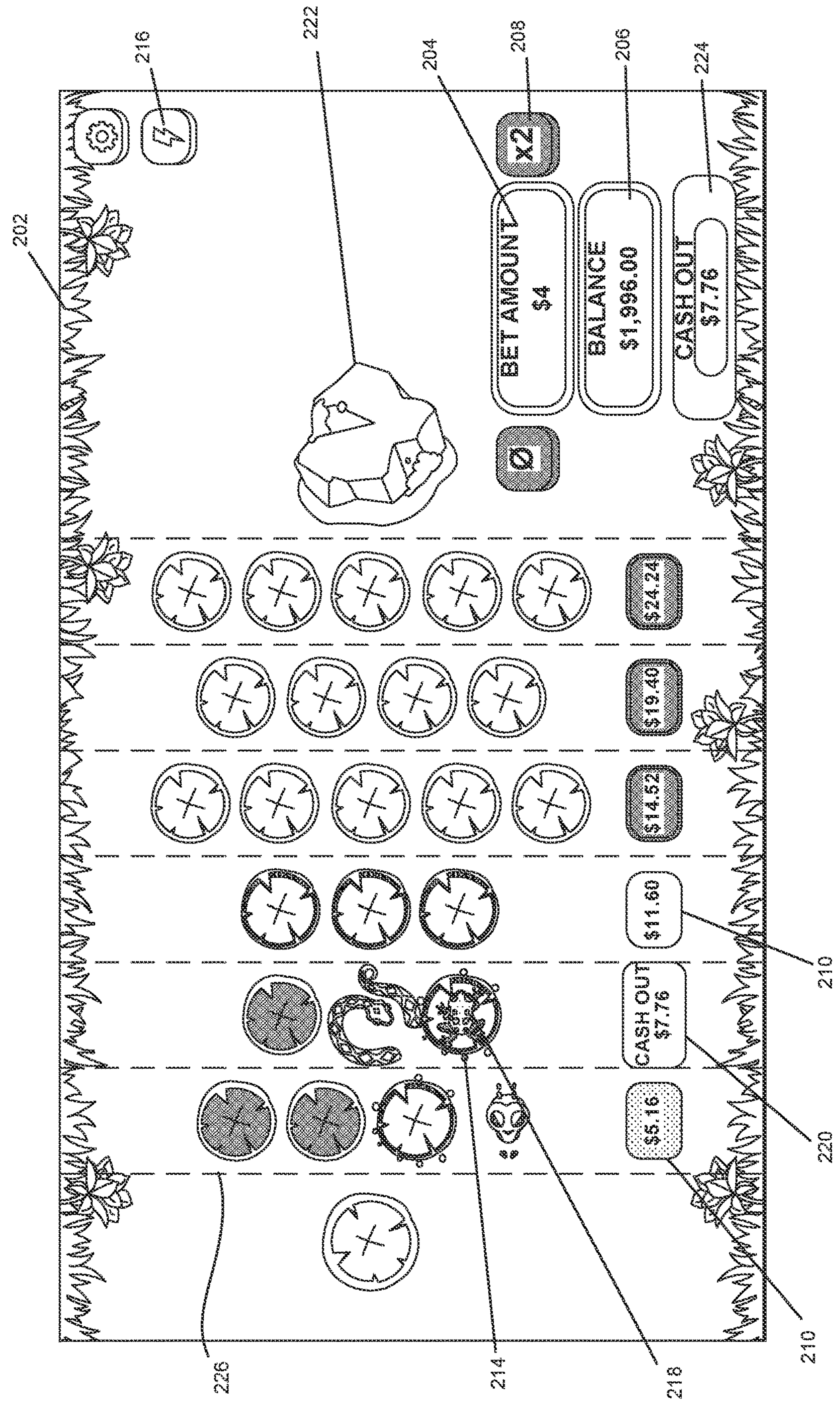
FIG. 2C illustrates a graphical user interface showing a respective cash-out outcome based on the position of an icon within the respective row or column, in accordance with one or more implementations.

Referring now to FIG. 2C in the context of the components described in connection with FIGS. 1A and 1B, the graphical user interface 202 is presented on a client device 120, for example, in response to a second input of navigation for a play of the navigation game. As detailed herein, the graphical user interface 202 is dynamically updated to reveal the space condition of each space 214 in the column 226 in which the icon 218 has been navigated to. As shown, the space condition of middle space 214 of the second column 226 (in which the icon 218 is now positioned) is revealed. The space condition of middle space 214 corresponds to a termination condition. A space 214 corresponding to a termination condition may cause the data processing system 105A to immediately terminate the play of the game upon navigation of the icon 218 to said space 214. In some implementations, the player has a predetermined amount of "health," which may be initialized at the start of the play of the game and decremented when the icon is navigated to a space 214 corresponding to a termination condition. If the health is decremented to zero (or another predetermined threshold value), the data processing system 105A can terminate the play of the game. In some implementations, the health value can be decremented when the icon 218 navigated to spaces 214 corresponding to termination conditions, and in some implementations, the health of the icon 218 can be incremented by completing certain tasks in the game (e.g., navigating to spaces 214 corresponding to a bonus health value, etc.). Furthermore, as detailed herein, the cash-out button 220 corresponding to the second column 226 is updated to reflect a payout of $7.76, as opposed to $5.16 displayed for the first column 226.

Figure 2D:
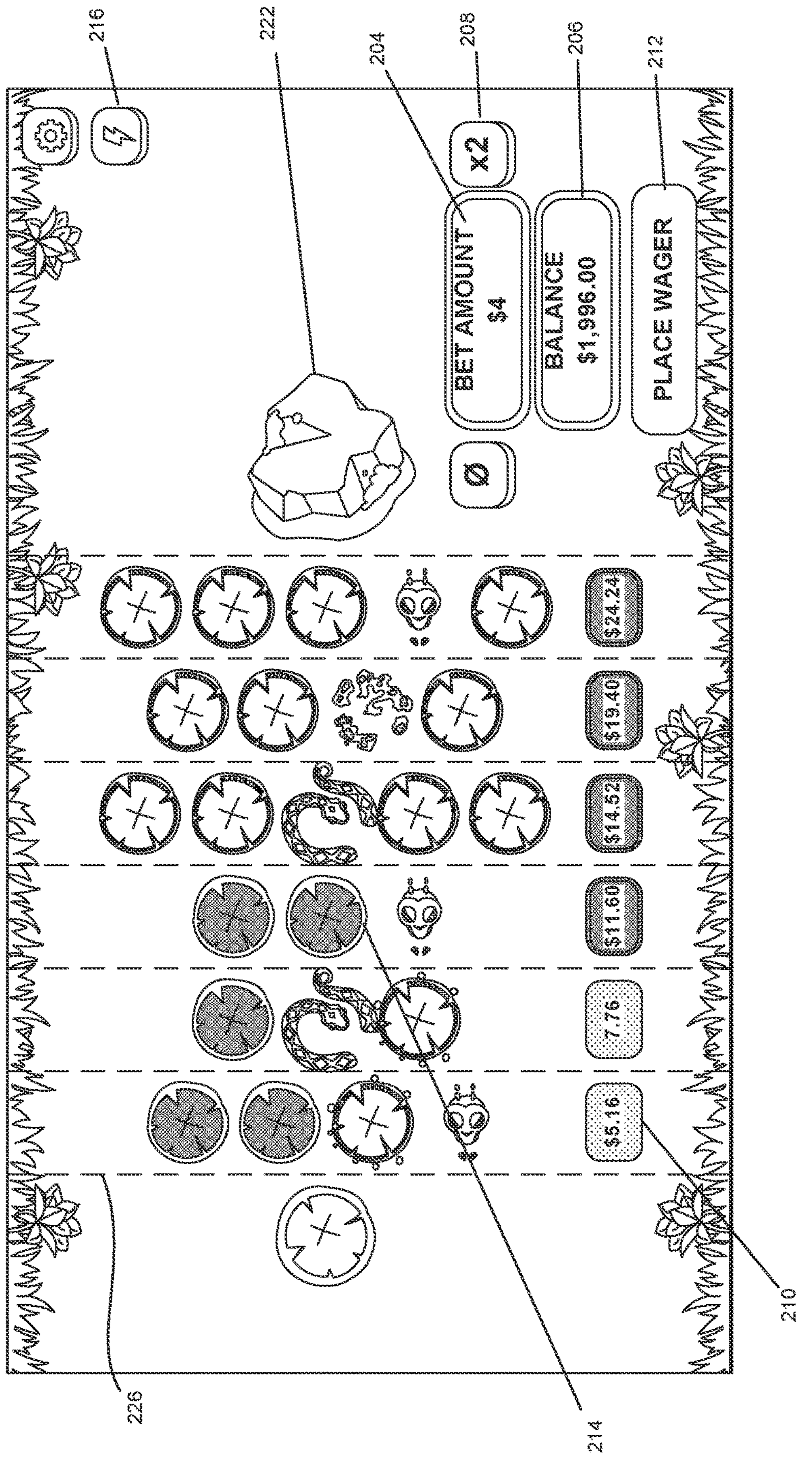
FIG. 2D illustrates a graphical user interface indicating a termination condition based on a space condition of a target space, in accordance with one or more implementations.

Referring now to FIG. 2D in the context of the components described in connection with FIGS. 1A and 1B, depicted is the graphical user interface 202 following a third input to navigate the icon 218. As described herein, if the icon is navigated to a space 214 corresponding to a termination condition, the play of the game may be immediately terminated. The data processing system 105A can update the graphical user interface 202 to reflect termination of the play, for example, by transitioning to reveal the space condition of each space 214 in the set of columns 226. In this example, the input to navigate the icon 218 (not shown here because the data processing system 105A has updated the graphical user interface 202 following termination of the play) to the bottom target space 214 in the third column 226 results in the termination condition (visually represented here by an alien face, but it could be any illustration, such as a swirling whirlpool or a snake) being satisfied. Upon determining that the icon 218 has been navigated to a space 214 corresponding to a termination condition, the data processing system 105A can terminate the play of the game and adjust the credit balance in the players profile 170 of the player by deducting the initial wager amount from the credit balance. In some implementations, the wager is deducted at the start of the play of the game, and terminating the play of the game simply restricts any award or payout for the play (e.g., the play loses their wager). In some implementations, upon satisfying the termination condition, the graphical user interface 202 is updated to display the space conditions of all target spaces 214 in all columns 226.

In some implementations, a bonus condition is satisfied when the icon 218 successfully navigates to the final space 222, represented here as a rock. When a bonus condition is satisfied, the graphical user interface 202 is dynamically updated to indicate that the bonus condition has been satisfied. Upon the bonus condition being satisfied, the data processing system 105A may provide one or more additional awards, including but not limited to an additional game play or a bonus award amount. The specific bonus award may be predetermined based on the game instructions 180 or may be selected by the player via the graphical user interface 202. Upon satisfying the bonus condition, the data processing system 105A can update the player profile 170 accordingly. The bonus award amount can be added to the credit balance of the player, as an alternative to or in addition to a standard award amount for the play of the game. In some implementations, the player profile 170 of the player may also be updated to include metadata corresponding to the plays of the game, including any indication of games won, the date and time of any award or bonus, the game in which the award or bonus was provided, and any conditions that were met during the play of the game. As described herein, the award amount of the random selection game can be determined as a function of the odds of winning a particular selected outcome and may be provided as part of the game instructions 180.

The adjustment in the credit balance can be made based on the computed bonus award and the individual award amounts calculated for each outcome. In some implementations, the data processing system 105A can increase the credit balance in the player's player profile 170 by the sum of the bonus award amount and the award amount for each successful outcome. However, if the bonus award condition is not satisfied, resulting in a zero bonus award amount, the data processing system 105A can increase the credit balance only by the award amounts for the winning outcomes. In cases where the bonus award Is credited to the player before the completion of the game, the data processing system 105A can update the credit balance of the player profile 170 by adding the award amounts for the winning outcomes to the credit balance.

Although the foregoing examples have been described in the context of the data processing system 105A and a client device 120, it should be understood that similar techniques may be performed using the data processing system 105B of FIG. 1B, which may be implemented as a standalone gaming console, kiosk, or machine. For example, rather than providing instructions to update the graphical user interface 202 at the client device 120, as in the foregoing examples, the data processing system 105B may display graphical user interfaces similar to those described in connection with FIGS. 2A-2D via the display device 185 and receive corresponding player interactions and wagers via the input device 160 and the wager receiver 165, respectively.

Figure 3:
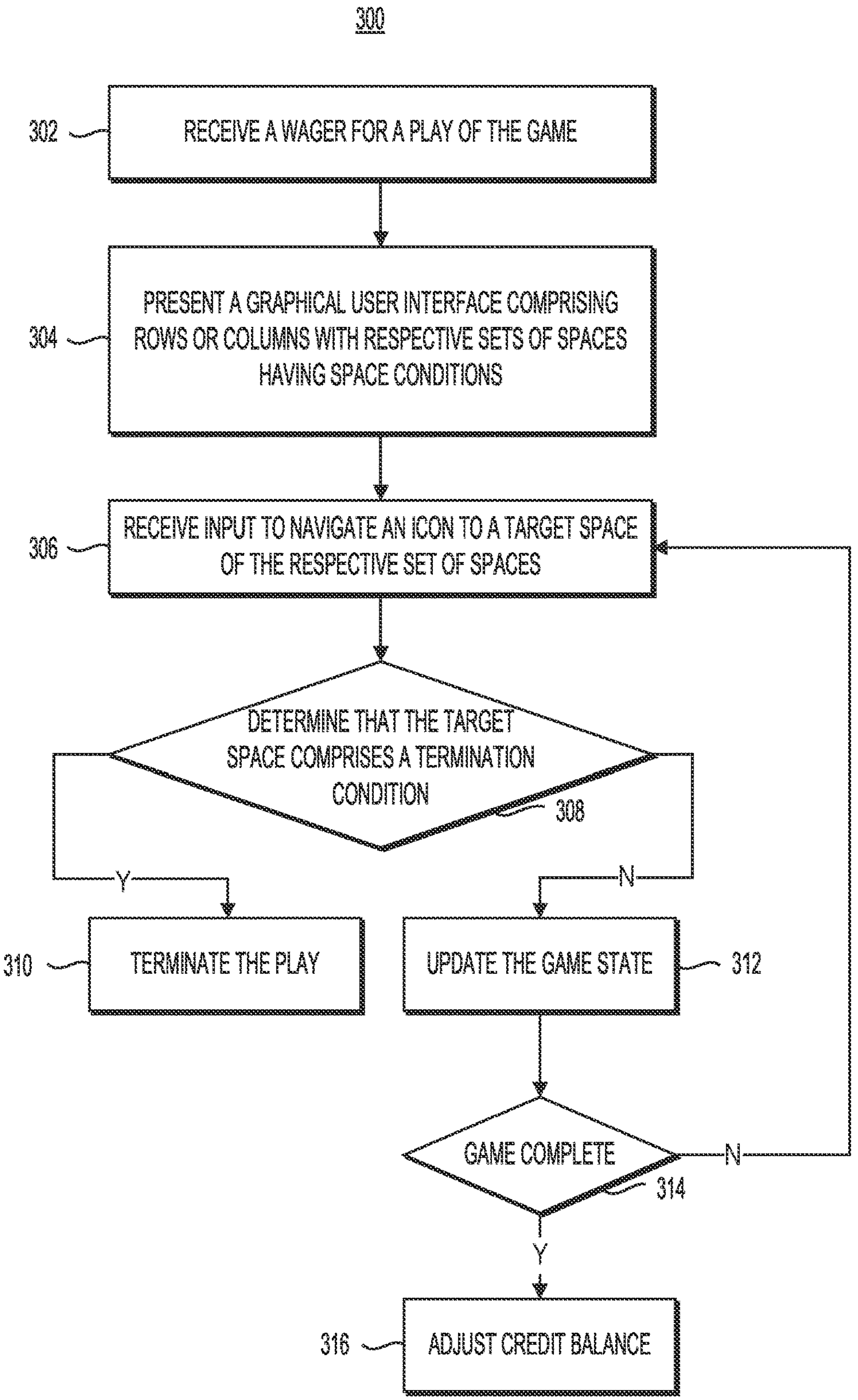
FIG. 3 illustrates an example flow diagram of a method for providing gaming system functionalities within the navigation game, in accordance with one or more implementations.

Referring now to FIG. 3 in the context of the components described in connection with FIGS. 1A and 1B, depicted is an illustrative flow diagram of a method 300 for providing a navigation game, specifically related to a navigation game. The method 300 can be executed, performed, or otherwise carried out by a gaming server or a gaming system. A data processing system (e.g., the data processing system 105A, the data processing system 105B) can be remote to one to one or more client devices and communicate with the one or more client devices via a computer network. In some implementations, the operations of method 300 can be performed by a standalone gaming device (e.g., without communicating with a gaming server to perform the method steps, the data processing system 105B). In a brief overview of method 300, the data processing system (e.g., the data processing system 105A, the data processing system 105B, etc.) can receive a wager for a play of the navigation game (STEP 302), present a graphical user interface having rows or columns with respective sets of spaces, with each space having a respective space condition (STEP 304), receive input to navigate an icon to a target space within the respective set of spaces (STEP 306), determine whether the target space satisfies a termination condition (STEP 308), terminate the play of the navigation game if the target space satisfies the termination condition (STEP 310) or update the game state if the termination condition is not satisfied (STEP 312), determine whether the game is completed (STEP 314), and adjust the credit balance in accordance with the outcome if the game is completed (STEP 316).

In further detail of method 300, the data processing system can receive a wager for a play of a navigation game (STEP 302). The wager can be received in one or more messages received from a client device. The message, or request, can indicate that a player intends to play a game provided by the data processing system. The message can include an indication of a player profile with which to access functionalities related to the game (e.g., placing wagers using earned credits, purchasing additional credits, etc.). The wager can be provided via a graphical user interface (e.g., the graphical user interface 202 of FIG. 2A). The wager amounts provided can be a specified amount of credits, such as 1, 5, 25, 100, 500, or 1000 credits. In some implementations, the player can specify a custom number or fractional number of credits used in the game. Once the wager has been selected, the client device can transmit a request to place the wagers for the play of the game.

Upon receiving the wager, the data processing system can generate a graphical user interface having multiple rows or columns, with each row or column including a respective set of spaces. (STEP 304). In the example implementation shown in FIGS. 2A-2D, the data processing system can transmit instructions to a client device 120, causing the client device 120 to present a graphical user interface that includes multiple rows or columns. In some implementations, the data processing system can present the graphical user interface via a display device (e.g., the display device 185). In this example, a grid with multiple columns is shown. However, it should be understood that a similar graphical interface may be generated to provide rows of spaces, where the rows may be arranged from top to bottom (or from bottom to top) on the graphical user interface. Each column can include a set of interactive spaces. The number of spaces in each column can vary depending on the game rules or preferences, and in some implementations, the data processing system can implementation a configuration where the number of spaces in each column is predetermined. In some implementations, the number of spaces in any given column may be randomly selected or determined based on the game instructions. For example, the number of spaces in a column may be selected inclusively from between two and six.

Each space can correspond to a respective space condition, which may also be randomly selected by the data processing system. The space conditions for a column may be selected such that as players navigate the icon across each column by interacting with different spaces, the data processing system may determine the corresponding space conditions, which leads to updates in the game state. The space conditions may include termination, win, and bonus conditions. The termination condition is a space condition that causes the play of the game to terminate without an award. When the data processing system determines that a space has been navigated to, and that the space condition of that space is a termination condition, the play of the game is terminated, and the game state information is updated accordingly. In some implementations, the player has a predetermined amount of "health," which may be initialized at the start of the play of the game and decremented when the icon is navigated to a space corresponding to a termination condition. If the health is decremented to zero (or another predetermined threshold value), the data processing system can terminate the play of the game. In some implementations, the health value can be decremented when the icon navigated to spaces corresponding to termination conditions, and in some implementations, the health of the icon can be incremented by completing certain tasks in the game (e.g., navigating to spaces corresponding to a bonus health value, etc.)

The win condition is another space condition that causes the play of the game to terminate while providing an award to the player (e.g., updating the credit balance). When the data processing system determines that the icon has been navigated to a space corresponding to a win condition, the data processing system can reward the player with an award amount by updating the credit balance of the player profile. The award amount may be reflected in the rectangular space of the column including the space corresponding to the win condition. In some implementations, the data processing system can determine that a bonus condition has been satisfied when the icon has been navigated to a final space. The bonus condition may result in the data processing system providing an additional bonus play (e.g., a free play), an additional or alternative award amount (e.g., of bonus credits), or other bonus awards.

Upon generating the graphical user interface with the gameboard of multiple columns and their respective sets of spaces, the data processing system can receive input from the player to navigate the icon to a target space within the first column (STEP 306). Each space (also referred to as the target space) within the set of spaces can function as an interactive element through which the player can interact to hop the icon. In response to an interaction with the target space, the data processing system can maintain the position of the icon within a specific column, and the icon can only be moved to the target space that is adjacent to the current column. The data processing system may restrict movement of the icon to certain target spaces, such as spaces within columns that are not adjacent to the column in which the icon is positioned. If the target space corresponds to a safe space condition, the data processing system 105A can update the game state information and display (or reveal) all the termination conditions in that column via the graphical user interface.

The data processing system can also determine whether the space condition of the target space corresponds to the termination condition (STEP 308). As detailed herein, if the space condition of the target space corresponds to a termination condition, the data processing system can terminate the play of the game (STEP 310). However, if the space condition of the target space does not involve the termination condition or the win condition but instead corresponds to the safe space condition, the data processing system can update the game state information and enable further inputs from the player to navigate the icon to the remaining (unnavigated) columns (STEP 312). The data processing system can adjust various aspects of the game state, such as scores, rewards, or any other relevant variables, based on the specific space condition and the outcome it can yield.

Upon receiving input to navigate the icon to the target space in the first column, the data processing system can dynamically update the graphical user interface to display a cash-out button in place of the rectangular space under the column in which the icon is currently positioned. The cash-out button for the column in which the icon is positioned is updated to a white color. The player can interact with the cash-out button to cash out the corresponding amount and terminate the game. The remaining rectangular spaces, corresponding to the columns that the icon has not navigated to, are grayed out. In some implementations, the grayed-out rectangular spaces may indicate the corresponding payouts, but the cash-out button is only displayed for a column when the icon is successfully navigated to that column. The color of the rectangular spaces is dynamically updated by the data processing system based on the player's input. For example, when the player navigates the icon to a new column, the data processing system can replace the rectangular space of that column with the cash-out button and updates the color of the cash-out button for that column to white. The data processing system can also update the color of the adjacent rectangular space to white, as the player may decide to navigate the icon to the adjacent column next. Furthermore, as shown in connection with FIG. 2C, the graphical user interface 202 is updated to slightly gray out the rectangular space of the previous column (the first column) where the icon was positioned before navigating to the adjacent column, indicating that the icon can no longer be navigated back to the previous (first) column. The data processing system can keep track of which columns the icon has already navigated to and which columns it has not navigated to.

In some implementations, as shown in FIG. 2B, upon navigating the icon to the first column, the graphical user interface is dynamically updated to display a cash-out button in place of the wager button, as shown on the bottom right of the graphical user interface. The player can interact with the cash-out button to cash out the corresponding amount and terminate the game. As detailed herein, the player can also cash out and terminate the game by interacting with the cash-out button under the column in which the icon is positioned. The data processing system can update the player profile in response to an interaction with the cash-out buttons. Moreover, in response to the interaction with the cash-out buttons, the data processing system can reset the game state information to its initial state and update the graphical user interface to reflect this change. The graphical user interface is updated to reset all columns to their initial state.

Each column can correspond to a specific score. In some implementations, the respective score of each column can be determined based on the number of spaces corresponding to termination condition and the difficulty level in the column to compute the appropriate cash-out amount for the columns. For example, if the number of spaces corresponding to termination condition in a column increases, the data processing system may increase the cash-out amount for that column. However, if the difficulty level in a column decreases, the data processing system may decrease the cash-out amount for that column. In some implementations, the data processing system can determine the cash-out amounts based on the position of the icon in a column. For example, if the player has successfully navigated through a number of columns, the data processing system may increase the cash-out amount for subsequent columns.

During the play of the game, the data processing system can determine whether the gameplay is completed (STEP 314). The data processing system can determine whether the gameplay is completed by monitoring the space condition of the target space that the player has navigated to. For example, as detailed herein, the data processing system can enable further inputs to navigate the icon to the remaining (unnavigated) columns as long as the termination condition or the win condition is not satisfied. The process continues until the space condition satisfies either the win condition, the termination condition, or the icon navigates to the final space, represented as a rock (or another illustration). If the icon navigates to the final space, the bonus condition is satisfied, which causes the data processing system to terminate the play of the game. Once the play of the game is completed, the data processing system can update the credit balance of the player profile based on the outcome of the game (STEP 316). The adjustment is made based on the computed bonus award and the individual award amounts calculated for each outcome. In some implementations, the data processing system can increase the credit balance in the player's player profile by the sum of the bonus award amount and the award amount for each successful outcome. However, if the bonus award condition is not satisfied, resulting in a zero bonus award amount, the data processing system can increase the credit balance only by the award amounts for the winning outcomes. In cases where the bonus award is credited to the player before the completion of the game, the data processing system can update the credit balance of the player profile by adding the award amounts for the winning outcomes to the credit balance. The data processing system can store additional metadata relating to the plays of the game, including but not limited to the award amount(s) won, along with corresponding timestamps indicating the time the award amount(s) were won, in the player profile.

C. Systems and Methods for Games Including Bonus Selection Games

Referring now to one example implementation of a navigation game, particularly directed to a bonus selection game, the data processing system 105A can present a graphical user interface. The graphical user interface can include a set of graphical elements that enable the automatic selection of bonus parameters and multiplier parameters for the play of the game. The play of the game is then executed according to the bonus parameters and a credit balance of the player is adjusted based on the selected multiplier parameter(s) and the outcome of the play. The bonus parameters can influence gameplay, outcomes, and player rewards. The bonus parameters can include a range of features, including (but not limited to) multipliers, jet packs (or similar game enhancements), mysteries, and other in-game benefits. The data processing system can update the graphical user interface to reflect the selections and the outcome of the play. Example graphical user interfaces showing an example implementation of the bonus selection game are shown in FIGS. 4A-4D.

Figure 4A:
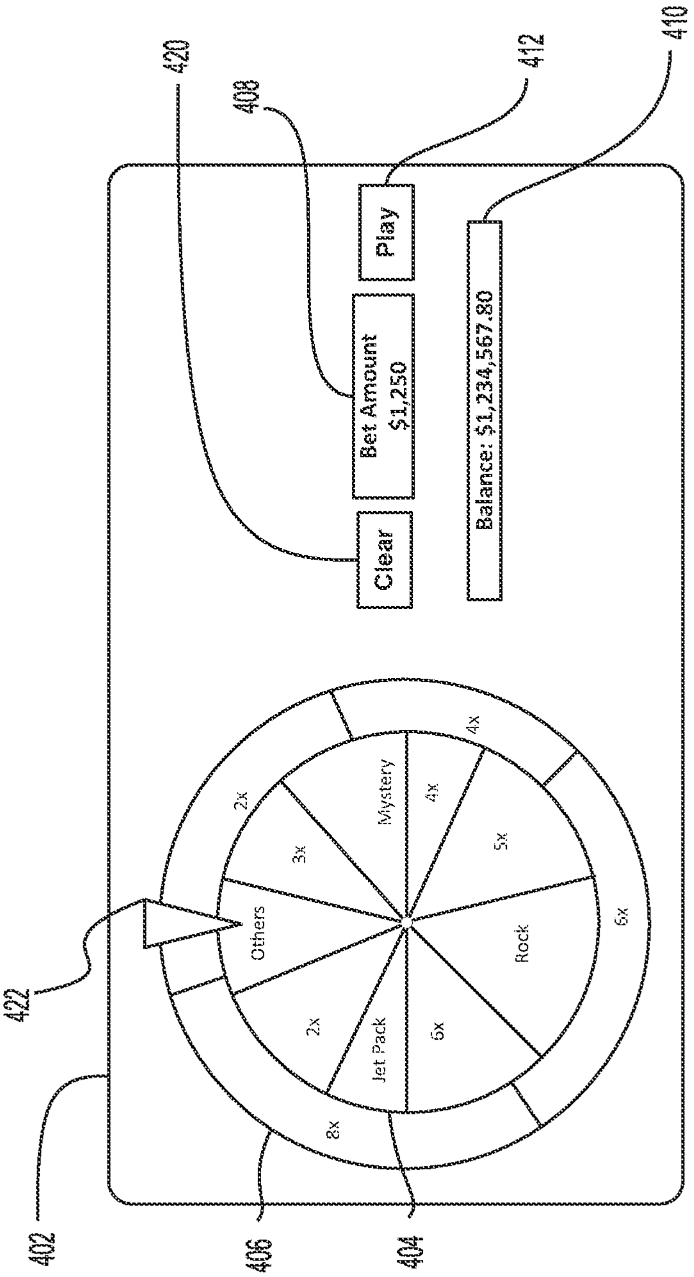
FIG. 4A illustrates a first graphical user interface showing a set of graphical elements for a bonus selection game, in accordance with one or more implementations.

Referring to FIG. 4A in the context of the components described in connection with FIGS. 1A and 1B, a first graphical user interface 402 for a bonus selection game is presented on a client device 120. As discussed above, the device communicator 130 facilitates communication between the client device 120 and the data processing system 105A, allowing players to interact with the first graphical user interface 402 and transmit their actions to the data processing system 105A. As players engage with the first graphical user interface 402, their actions, such as placing bets by interacting with a bet amount button 408 or initiating the game by interacting with a play button 412, are captured and utilized to update the state of the game (e.g., in the game state information 175). The corresponding player profile 170 of the player may also be updated to reflect wager history, gameplay statistics, or credit balance changes resulting from one or more plays of the multi-hand card game.

As shown in FIG. 4A, the first graphical user interface 402 displays a set of graphical elements 404, 406, symbolized as concentric circles. In some implementations, the set of graphical elements 404, 406 may be displayed in different shapes, such as squares, triangles, stars, or other variations. In some implementations, the graphical elements 404, 406 may be a set of interactive elements that can be interacted with using input methods such as tapping, spinning, long-pressing, and clicking, among others. A pointer 422 can be positioned on the concentric circles (graphical elements 406, 406) to indicate the selection of the parameters. In some implementations, the pointer 422 remains stationary and serves to mark the selected parameters on the concentric circles (graphical elements 406, 406). The data processing system 105A can then store the parameters indicated by the pointer 422 as the selected parameters.

In the provided illustration, the inner circle on the first graphical user interface 402 represents a set of first graphical elements 404. The first graphical elements 404 correspond to bonus parameters for the play of the game. The bonus parameters can include a range of features that can influence the gameplay, such as enabling the selection of throwing objects (e.g., rocks) to uncover the space condition of a space in a bonus selection game, as described in further detail herein. In some implementations, the bonus parameters may cause the game to result in an instantaneous win. The bonus parameters may also include multipliers, jet packs (or similar enhancements), mysteries, and other in-game benefits. There can be additional bonus parameters and variations that can be incorporated to further enhance the gameplay experience.

The outer circle on the first graphical user interface 402 represents the set of second graphical elements 406. The second graphical elements 406 correspond to the multiplier parameters for the play of the game. The multiplier parameters, such as 2× or 3×, determine the multiplier factor applied to certain outcomes or rewards within a play of a bonus selection game. For example, if a 2× multiplier parameter is selected, the data processing system 105A can double any award amount received at the conclusion of a subsequent play of the bonus selection game. This indicates that if a player wins $10, the payout will be $20.

Within the first graphical user interface 402, players can interact with several interactive elements. For example, the bet amount button 408 enables players to set the amount of the wager. When a player interacts with the bet amount button 408, the data processing system 105A updates the first graphical user interface 402 to reflect the player's wager. The credit balance region 410 displays an amount of credits available for the player to wager on the game. The amount shown in the credit balance region 410 may be determined from a credit balance specified in the player profile 170 of the player. The credit balance region 410 may be updated in response to interactions with the bet amount button 408. Wagers made on the play of the game can be subtracted from the credit balance of the player. Any changes to the credit balance can be reflected via dynamic updates to the credit balance region 410. In some implementation, the first graphical user interface 402 displays a clear button 420 that the player can interact with. In response to interaction with the clear button 420, the data processing system 105A can remove or erase the wager that the player has entered. In some implementations, the graphical user interface 202 can be updated via the clear button 420 to reset all the selections made by a player to their default state. The data processing system 105A can also update the player profile 170 to reflect the outcome of the previous play. For example, if the player won the previous play, the data processing system 105A would increment the player's win count and adjust the credit balance.

The first graphical user interface 402 displays a play button 412 to initiate a play of the game. In response to an interaction with the play button 412, the data processing system 105A can randomly select the bonus and multiplier parameters from the set of graphical elements 404, 406, respectively. In doing so, the graphical user interface 202 may be updated to show an animation of the elements 404, 406 spinning, and landing such that the selected bonus and multiplier parameters align with the pointer 422. The first graphical user interface 402 may be dynamically updated to reflect the selection of the respective parameters. In some implementations, the first graphical user interface 402 may be dynamically updated to reflect any changes in the game state information 175. In response to an interaction with the play button 412, the data processing system 105A can initiate gameplay via a second graphical user interface 416, as shown in connection with FIG. 4B.

Figure 4B:
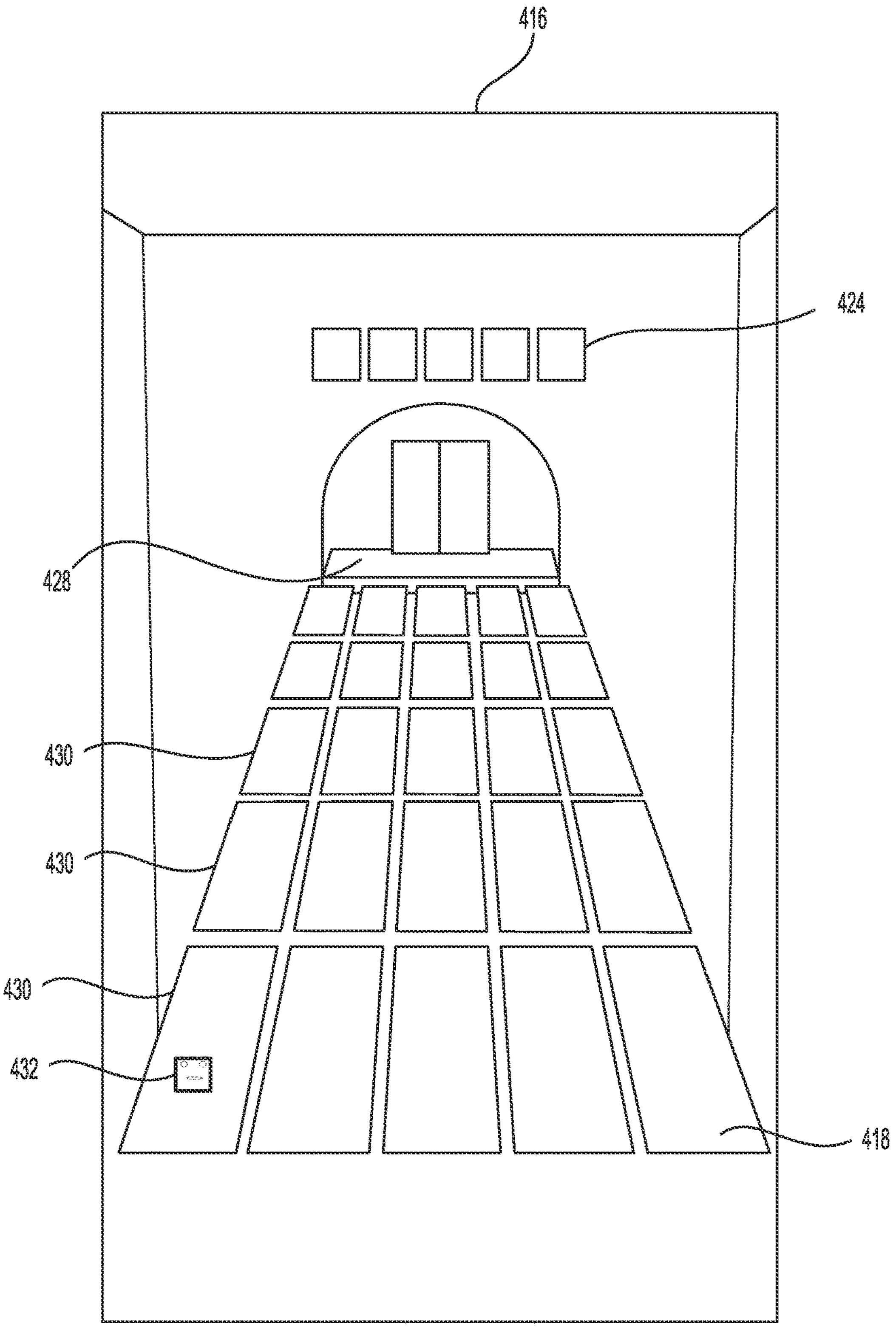
FIG. 4B illustrates a second graphical user interface showing the navigation of a player through multiple rows or columns, in accordance with one or more implementations.

Referring now to FIG. 4B in the context of the components described in connection with FIGS. 1A and 1B, a second graphical user interface 416 is presented on a client device 120, for example, in response to a request for a play of the bonus selection game. As shown in FIG. 4B, similar to the illustration depicted in FIGS. 2A-2D of the navigation game, the data processing system 150A in the bonus selection game can present a grid of multiple rows or columns (shown here as a grid with multiple rows 430) with a set of spaces 418 via the second graphical user interface 416. In this example, each row 430 in the second graphical user interface 416 includes a predetermined set of spaces (also referred to as target spaces 418), where each target space 418 within a row 430 can function as an interactive element to which the player can navigate an icon 432. The number of spaces 418 in each row 430 can vary depending on the game rules or preferences.

Each target space 418 in the bonus selection game can correspond to a respective space condition. As the player navigates the icon 432 through the multiple rows 430 by interacting with different target spaces 418, the corresponding space conditions of the target spaces 418 to which the icon 432 is navigated are revealed and evaluated, resulting in updates to the game state information 175. These space conditions can include, but are not limited to, termination conditions or safe conditions. The termination condition corresponds to a specific space condition that causes the gameplay to terminate. When the data processing system 105A determines that a target space 418 has been navigated to that corresponds to a termination condition, the play of the game is terminated, and the game state information 175 is updated accordingly. The data processing system 105A then promptly updates the second graphical user interface 416 to transition back to the first graphical user interface 402, showing additional graphical elements as described in connection with FIG. 4D.

Other space conditions may include safe space conditions. The safe space condition enables the icon 432 to be navigated safely to the selected target space 418 and enables the data processing system 105A to accept additional inputs via the second graphical user interface 416 to navigate the icon 432 to the next adjacent row 430. The second graphical user interface 416 can present one or more interactive elements or buttons that when interacted with, cause the icon 432 to be navigated to a selected target space 418 the selected row 430. The space conditions may also incorporate a win condition that is generally satisfied when the data processing system 105A determines that a target space 418 has been successfully navigated to a final space 428. The win condition may unlock special bonuses or additional rewards for the player. Furthermore, the win amount can be displayed via display reels 424, which are located in the center of the second graphical user interface 416. The win condition may result in the data processing system 105A providing an additional play (e.g., a free play), an additional or alternative award amount (e.g., of bonus credits), or other bonus awards.

As detailed herein, the gameplay in the bonus selection game can be affected by the bonus parameters selected from the set of first graphical elements 404. The data processing system 105A can access the game state information 175 via the state manager 140 to determine which bonus parameters have been selected. If the selected bonus parameter identifies a player-selectable gameplay action, such as the ability to reveal whether a space 418 is corresponds to a termination condition, the data processing system 105A can then present one or more interactive buttons 426 in the second graphical user interface 416 identifying the player-selectable gameplay action, as shown in connection with FIG. 4C. The selected bonus parameters can be applied to the game by interacting with one or more interactive buttons 426. When one or more interactive buttons 426 are interacted with, the data processing system 105A first identifies the bonus parameter associated with the interactive button 426.

The data processing system 105A then applies the bonus parameter to the game state. For example, if the bonus parameter is to reveal the space condition of a selected space 418 (e.g., using a "rock"), the graphical user interface 416 may be updated to prompt the player to select a space to reveal. In some implementations, if the bonus parameter is a mystery, the interactive button 426 may randomly reveal the bonus (e.g., randomly select from a rock, a multiplier, a jetpack, etc.) upon an interaction with the interactive element 426. In some implementations, if the bonus parameter is a "jet pack," the play of the game may result in an instant win. In some implementations, the instant win may be activated in response to an interaction with the interactive element 426, if a jetpack was randomly selected as the bonus parameter as described in connection with FIG. 4A.

Figure 4C:
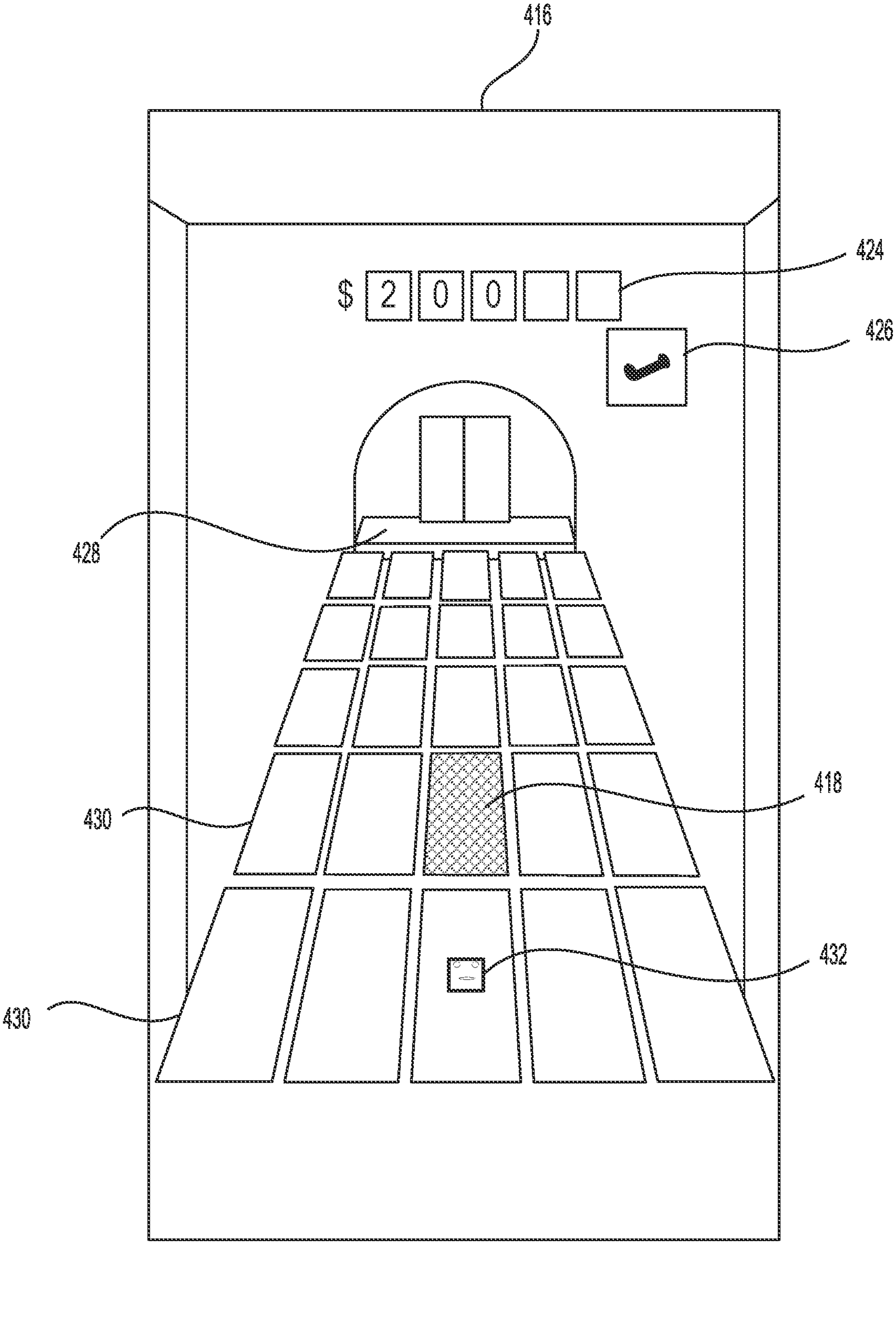
FIG. 4C illustrates a second graphical user interface identifying the termination condition of a target space, in accordance with one or more implementations.

Referring now to FIG. 4C in the context of the components described in connection with FIGS. 1A and 1B, illustrated is the second graphical user interface 416 depicting which spaces of the rows 430 correspond to a termination condition. In some implementations, the space condition of each space 418 may be revealed via the graphical user interface 416 when the icon 432 is navigated to a space 418 corresponding to a termination condition. In some implementations, in the example shown in FIG. 4C, the data processing system 105A can identify the termination (or space) condition of a corresponding target space 418 in response to receiving an interaction with one or more interactive buttons 426. The second graphical user interface 416 can be updated to initiate the reveal of one or more selected (e.g., player-selected or randomly selected) spaces 418. Revealing the space condition of the space 418 may be represented via the graphical user interface 416 via a graphical animation, for example, an animation of throwing an object (e.g., a rock) at the selected space 418. Additionally, visual feedback may be provided via the second graphical user interface 416 (e.g., additional animations of glass shattering if the space 418 corresponds to a termination condition). The visual feedback can include a change in the appearance of the target space 418, such as a change in color, size, or shape. In some implementations, the feedback can include a sound effect, such as a loud crash or a satisfying thud. In some implementations, the second graphical user interface 416 can display a text message to confirm the outcome of the action. As described in connection with FIGS. 2A-2D, in some implementations, the navigation game described in connection with FIGS. 4A-4C may involve navigating the icon 432 to sequentially ordered rows 430. For example, the player may be able to select any space 418 in the next (e.g., next closest to the final space 428) row 430 to which to navigate the icon 432. In some implementations, the icon 432 may be navigated to adjacent spaces in the same row 430, as shown between FIGS. 4B and 4C.

In the provided example, when the rock hits the target space 418, the second graphical user interface 416 is updated to visually depict the transformation of the target space 418 from its intact state to shattered glass, if the target space 418 satisfies the termination condition. The data processing system 105A incorporates data structures (e.g., the state manager 140) to maintain the game state information 175, including the state of the target space 418. These data structures are then updated to reflect the changes in the game state. The data processing system 105A can cause the second graphical user interface 416 to update the available target spaces 418 for the player to interact with (e.g., showing one or more respective space conditions). In some implementations, the data processing system 105A can keep track of the number of intact target spaces 418 available for the player to interact with to navigate the icon 432. For example, the number of target spaces 418 that are still intact can be determined by counting the number of 1s in the binary tree.

In the provided illustration, when the player successfully navigates to the final target space 428, the second graphical user interface 416 can be dynamically updated to indicate that the win condition has been satisfied. In some implementations, the data processing system 105A can keep track of the player's progress throughout the game via the second graphical user interface 416. In some implementations, if the player successfully navigates to the final row 430, the data processing system 105A can identify that the win condition has been satisfied. In some implementations, the data processing system 105A can keep track of the player's score. The score can be calculated based on the number of rows 430 that the player has navigated through. For example, if the player's score satisfies a certain threshold, the data processing system 105A can determine that the win condition has been satisfied. Upon satisfying the win condition, the data processing system 105A may provide one or more additional awards, including but not limited to an additional game play or a bonus award amount. The specific bonus award may be predetermined based on the game instructions 180 or may be selected by the player via the second graphical user interface 416.

The data processing system 105A can update a credit balance of the player profile 170 based on the score in response the player winning the play of the game. In some implementations, a bonus award amount can be added to the credit balance of the player profile 170, as an alternative to or in addition to a standard award amount for the play of the game. Once the play of the game is completed, the data processing system 105A can update the credit balance of the player profile 170 based on the selected multiplier parameters from the set of second graphical elements 406. When the win condition is satisfied, the data processing system 105A can update the credit balance of the player profile 170 by multiplying the winning reward by the selected multiplier. For example, if the winning reward is 100 credits and a multiplier of 2 has been selected by the data processing system 105A, the player may receive 200 credits for winning the game. The player profile 170 of the player may also be updated to include metadata corresponding to the plays of the game, including any indication of games won, the date and time of any reward or bonus, the game in which the reward or bonus was provided, and any conditions that were met during the play of the game. As described herein, the award amounts can be determined as a function of the odds of winning a particular selected outcome and may be provided as part of the game instructions 180.

Figure 4D:
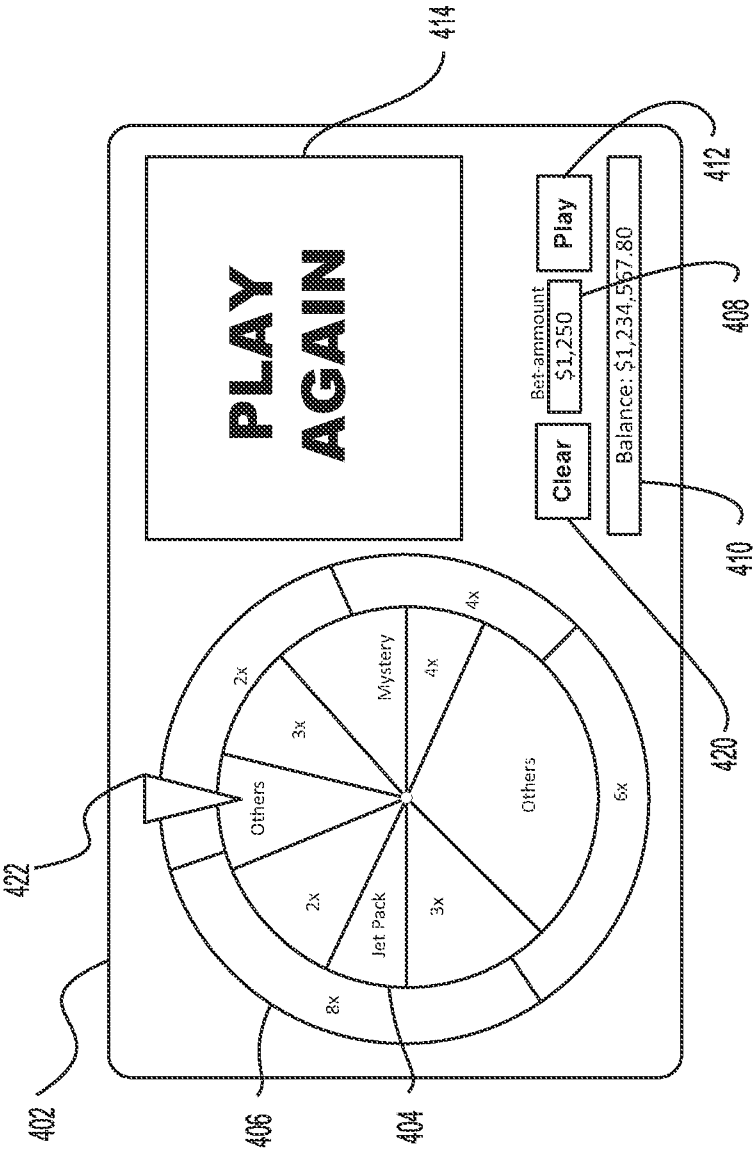
FIG. 4D illustrates an updated first graphical user interface providing an option to initiate a subsequent play of the game in response to the termination or completion of the game, in accordance with one or more implementations.

In some implementations, when the gameplay is completed or terminated, the second graphical user interface 416 can transition back to the first graphical user interface 402. The first graphical user interface 402 may be updated to provide an interactive button to initiate a subsequent play of the bonus selection game, as described in connection with FIG. 4D. As shown in FIG. 4D, the updated first graphical user interface 402 displays a play again button 414 positioned at the top right corner across the set of first and second graphical elements 404, 406. In response to an interaction with the play again button 414, the data processing system 105A updates the first graphical user interface 402 to start a new play of the game. In some implementations, the data processing system 105A may maintain the bonus and multiplier parameters selected during the previous game. In some implementations, the data processing system 105A can enable the selection of new bonus and multiplier parameters.

The adjustment in the credit balance is made based on the computed bonus award and the individual award amounts calculated for each outcome. In some implementations, the data processing system 105A can increase the credit balance in the player's player profile 170 by the sum of the bonus award amount and the award amount for each successful outcome. However, if the bonus award condition is not satisfied, resulting in a zero bonus award amount, the data processing system 105A can increase the credit balance only by the award amounts for the winning outcomes. In cases where the bonus award is credited to the player before the completion of the game, the data processing system 105A can update the credit balance of the player profile 170 by adding the award amounts for the winning outcomes to the credit balance.

Although the foregoing examples have been described in the context of the data processing system 105A and a client device 120, it should be understood that similar techniques may be performed using the data processing system 105B of FIG. 1B, which may be implemented as a standalone gaming console, kiosk, or machine. For example, rather than providing instructions to update the first graphical user interface 402 or the second graphical user interface 416 at the client device 120, as in the foregoing examples, the data processing system 105B may display graphical user interfaces similar to those described in connection with FIGS. 4A-4D via the display device 185 and receive corresponding player interactions and wagers via the input device 160 and the wager receiver 165, respectively.

Figure 5:
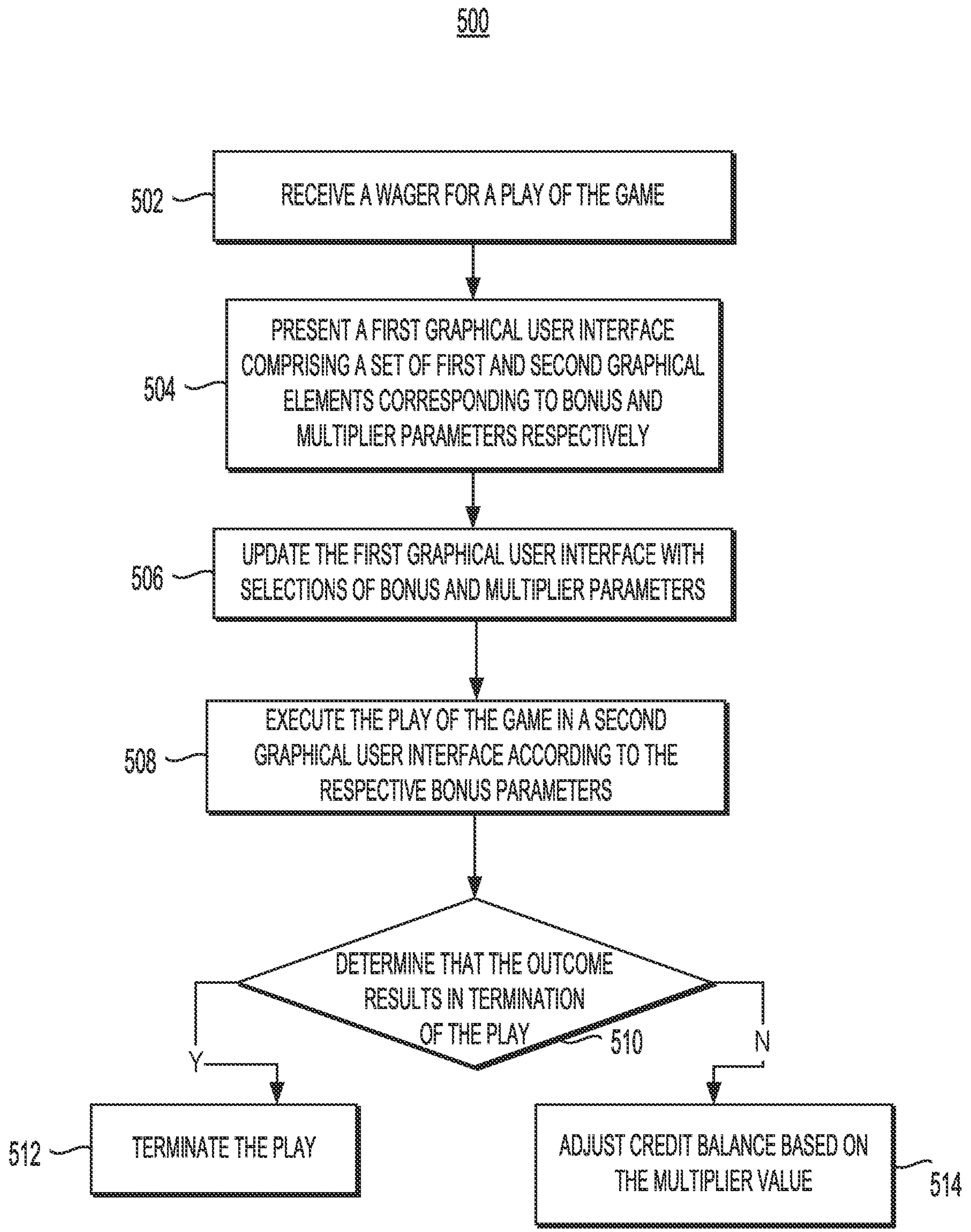
FIG. 5 illustrates an example flow diagram of a method for providing gaming system functionalities within the bonus selection game, in accordance with one or more implementations.

Referring now to FIG. 5 in the context of the components described in connection with FIGS. 1A and 1B, depicted is an illustrative flow diagram of a method 500 for providing a navigation game, particularly directed to a bonus selection game. The method 500 can be executed, performed, or otherwise carried out by a gaming server or a gaming system. A data processing system (e.g., the data processing system 105A, the data processing system 105B) can be remote to one to one or more client devices and communicate with the one or more client devices via a computer network. In some implementations, the operations of method 5500 can be performed by a standalone gaming device (e.g., without communicating with a gaming server to perform the method steps, the data processing system 105B). In a brief overview of method 500, the data processing system can receive a wager for a play of the bonus selection game (STEP 502), present a first graphical user interface having a set of first and second graphical elements that correspond to bonus and multiplier parameters, respectively (STEP 504), update the first graphical user interface with selections of bonus and multiplier parameters (STEP 506), execute the play of the game within a second graphical user interface according to the respective bonus parameters (STEP 508), determine that the outcome results in termination of the play (STEP 510), and terminate the play if the outcome results in termination of the play (STEP 512). The data processing system can adjust the credit balance based on the multiplier value if the outcome fails to result in the termination of the play (STEP 514).

In further detail of method 500, the data processing system can receive a wager for a play of the bonus selection game (STEP 502). The wager can be received in one or more messages received from a client device. The message, or request, can indicate that a player intends to play a game provided by the data processing system. The message can include an indication of a player profile with which to access functionalities related to the game (e.g., placing wagers using earned credits, purchasing additional credits, etc.). The wager can be provided via a graphical user interface (e.g., the graphical user interface 402 of FIG. 4A). The wager amounts provided can be a specified amount of credits, such as 1, 5, 25, 100, 500, or 1000 credits. In some implementations, the player can specify a custom number or fractional number of credits used in the game. Once the wager has been selected, the client device can transmit a request to place the wagers for the play of the game.

The data processing system can generate a first graphical user interface having sets of first and second graphical elements (STEP 504). The set of first graphical elements corresponds to bonus parameters, and the set of second graphical elements corresponds to multiplier parameters. The play of the game is then executed according to the bonus parameters and a credit balance of the player is adjusted based on the selected multiplier parameter(s) and the outcome of the play. The bonus parameters can influence gameplay, outcomes, and player rewards. The bonus parameters can include a range of features, including (but not limited to) multipliers, jet packs (or similar game enhancements), mysteries, and other in-game benefits. There can be additional bonus parameters and variations that can be incorporated to further enhance the gameplay experience. The multiplier parameters, such as 2× or 3×, determine the multiplier factor applied to certain outcomes or rewards within a play of a bonus selection game. For example, if a 2× multiplier parameter is selected, the data processing system 105A can double any award amount received at the conclusion of a subsequent play of the bonus selection game. In some implementations, the set of graphical elements may be displayed in different shapes, such as circles, squares, triangles, stars, or other variations. In some implementations, the graphical elements may be a set of interactive elements that can be interacted with using input methods such as tapping, spinning, long-pressing, and clicking, among others. A pointer can be positioned on the graphical elements to indicate the selection of the parameters. In some implementations, the pointer remains stationary and serves to mark the selected parameters on the graphical elements. The data processing system can then store the parameters indicated by the pointer as the selected parameters.

Upon receiving the wager, the data processing system can randomly select the bonus and multiplier parameters from the set of graphical elements. In doing so, the first graphical user interface may be dynamically updated to reflect the selection of the respective parameters (STEP 506). In some implementations, the first graphical user interface may be dynamically updated to reflect any changes in the game state information.

Upon receiving the player's request to initiate the play of the bonus selection game, the data processing system can execute the play of the game in a second graphical user interface (STEP 508). The data processing system can present a grid of multiple rows or columns (shown here as a grid with multiple rows) with a set of spaces via the second graphical user interface. In this example, each row in the second graphical user interface includes a predetermined set of spaces (also referred to as target spaces), where each target space within a row can function as an interactive element to which the player can navigate an icon. The number of spaces in each row can vary depending on the game rules or preferences. The data processing system enables navigation of an icon within the corresponding set of target spaces in the initial row (first row). The data processing system can maintain the position of the icon within a specific row, and the player can only move the icon to the target space that is adjacent to the current row. The data processing system may restrict movement of the icon to certain target spaces, such as spaces within rows that are not adjacent to the row in which the icon is positioned.

Each target space in the bonus selection game can correspond to a respective space condition. As the player navigates the icon through the multiple rows by interacting with different target spaces, the corresponding space conditions of the target spaces to which the icon is navigated are revealed and evaluated, resulting in updates to the game state information. These space conditions can include, but are not limited to, termination conditions or safe conditions. The termination condition corresponds to a specific space condition that causes the gameplay to terminate. When the data processing system determines that a target space has been navigated to that corresponds to a termination condition, the play of the game is terminated, and the game state information is updated accordingly. The data processing system then promptly updates the second graphical user interface to transition back to the first graphical user interface, showing additional graphical elements as described in connection with FIG. 4D.

Other space conditions may include safe space conditions. The safe space condition enables the icon to be navigated safely to the selected target space, and enables the data processing system to accept additional inputs via the second graphical user interface to navigate the icon to the next adjacent row. The second graphical user interface can present one or more interactive elements or buttons that when interacted with, cause the icon to be navigated to a selected target space the selected row. The space conditions may also incorporate a win condition that is generally satisfied when the data processing system determines that a target space has been successfully navigated to a final space. The win condition may unlock special bonuses or additional rewards for the player. Furthermore, the win amount can be displayed via display reels, which are located in the center of the second graphical user interface. The win condition may result in the data processing system providing an additional play (e.g., a free play), an additional or alternative award amount (e.g., of bonus credits), or other bonus awards.

The gameplay in the bonus selection game can be affected by the bonus parameters selected from the set of first graphical elements. The data processing system can access the game state information via the state manager to determine which bonus parameters have been selected. If the selected bonus parameter identifies a player-selectable gameplay action, such as the ability to reveal whether a space is corresponds to a termination condition, the data processing system can then present one or more interactive buttons in the second graphical user interface identifying the player-selectable gameplay action, as shown in connection with FIG. 4C. The selected bonus parameters can be applied to the game by interacting with one or more interactive buttons. When one or more interactive buttons are interacted with, the data processing system first identifies the bonus parameter associated with the interactive button. The data processing system then applies the bonus parameter to the game state. For example, if the bonus parameter reveals the termination condition of space, the corresponding outcome can be displayed.

In some implementations, the data processing system can identify the termination (or space) condition of a corresponding target space in response to receiving an interaction with one or more interactive buttons. The second graphical user interface can be updated to initiate the reveal of one or more selected (e.g., player-selected or randomly selected) spaces. Revealing the space condition of the space may be represented via the graphical user interface via a graphical animation, for example, an animation of throwing an object (e.g., a rock) at the selected space. Additionally, visual feedback may be provided via the second graphical user interface (e.g., additional animations of glass shattering if the space corresponds to a termination condition). The visual feedback can include a change in the appearance of the target space, such as a change in color, size, or shape. In some implementations, the feedback can include a sound effect, such as a loud crash or a satisfying thud. In some implementations, the second graphical user interface can display a text message to confirm the outcome of the action.

When the rock hits the target space, the second graphical user interface is updated to visually depict the transformation of the target space from its intact state to shattered glass, if the target space satisfies the termination condition. The data processing system incorporates data structures (e.g., the state manager) to maintain the game state information, including the state of the target space. These data structures are then updated to reflect the changes in the game state. The data processing system can cause the second graphical user interface to update the available target spaces for the player to interact with and jump onto.

The data processing system can track the progress of the game via the second graphical user interface and determine if the outcome results in the termination of the bonus selection game (STEP 510). If the termination condition is satisfied, such as breaking or shattering the glass, the second graphical user interface is updated to terminate the end of the play and initiate a transition back to the first graphical user interface (STEP 512). The first graphical user interface may be updated to provide an interactive button to initiate a subsequent play of the bonus selection game. However, if the player successfully navigates to the final target space, the second graphical user interface can be dynamically updated to indicate that the win condition has been satisfied. The data processing system can update a credit balance of the player profile based on the score in response the player winning the play of the game.

Once the play of the game is completed, the data processing system can adjust the credit balance of the player profile (STEP 514). The data processing system can adjust the credit balance of the player profile based on the selected multiplier parameters from the set of second graphical elements. When the win condition is satisfied, the data processing system can update the credit balance of the player profile by multiplying the winning reward by the selected multiplier. The adjustment in the credit balance is made based on the computed bonus award and the individual award amounts calculated for each outcome. In some implementations, the data processing system can increase the credit balance in the player profile of the player by the sum of the bonus award amount and the award amount for each successful outcome. However, if the bonus award condition is not satisfied, resulting in a zero bonus award amount, the data processing system can increase the credit balance only by the award amounts for the winning outcomes. In cases where the bonus award is credited to the player before the completion of the game, the data processing system can update the credit balance of the player profile by adding the award amounts for the winning outcomes to the credit balance. The data processing system can store additional metadata relating to the plays of the game, including but not limited to the award amount(s) won, along with corresponding timestamps indicating the time the award amount(s) were won, in the player profile.

D. Computing and Network Environment

Various operations described herein can be implemented on computer systems. FIG. 6 shows a simplified block diagram of a representative server system 600, client computer system 614, and network 626 usable to implement certain implementations of the present disclosure. In various implementations, server system 600 or similar systems can implement services or servers described herein or portions thereof. Client computer system 614 or similar systems can implement clients described herein. The system (e.g., the data processing system 105A) and others described herein can be similar to the server system 600.

Server system 600 can have a modular design that incorporates a number of modules 602; while two modules 602 are shown, any number can be provided. Each module 602 can include processing unit(s) 604 and local storage 606.

Processing unit(s) 604 can include a single processor, which can have one or more cores, or multiple processors. In some implementations, processing unit(s) 604 can include a general-purpose primary processor as well as one or more special-purpose co-processors such as graphics processors, digital signal processors, or the like. In some implementations, some or all processing units 604 can be implemented using customized circuits, such as application specific integrated circuits (ASICs) or field programmable gate arrays (FPGAs). In some implementations, such integrated circuits execute instructions that are stored on the circuit itself. In other implementations, processing unit(s) 604 can execute instructions stored in local storage 606. Any type of processors in any combination can be included in processing unit(s) 604.

Local storage 606 can include volatile storage media (e.g., DRAM, SRAM, SDRAM, or the like) and/or non-volatile storage media (e.g., magnetic or optical disk, flash memory, or the like). Storage media incorporated in local storage 606 can be fixed, removable or upgradeable as desired. Local storage 606 can be physically or logically divided into various subunits such as a system memory, a read-only memory (ROM), and a permanent storage device. The system memory can be a read-and-write memory device or a volatile read-and-write memory, such as dynamic random-access memory. The system memory can store some or all of the instructions and data that processing unit(s) 604 need at runtime. The ROM can store static data and instructions that are needed by processing unit(s) 604. The permanent storage device can be a non-volatile read-and-write memory device that can store instructions and data even when module 602 is powered down. The term "storage medium" as used herein includes any medium in which data can be stored indefinitely (subject to overwriting, electrical disturbance, power loss, or the like) and does not include carrier waves and transitory electronic signals propagating wirelessly or over wired connections.

In some implementations, local storage 606 can store one or more software programs to be executed by processing unit(s) 604, such as an operating system and/or programs implementing various server functions such as functions of the data processing systems 105A of FIG. 1A or any other system described herein, or any other server(s) associated with the data processing systems 105A, or any other system described herein.

"Software" refers generally to sequences of instructions that, when executed by processing unit(s) 604 cause server system 600 (or portions thereof) to perform various operations, thus defining one or more specific machine implementations that execute and perform the operations of the software programs. The instructions can be stored as firmware residing in read-only memory and/or program code stored in non-volatile storage media that can be read into volatile working memory for execution by processing unit(s) 604. Software can be implemented as a single program or a collection of separate programs or program modules that interact as desired. From local storage 606 (or non-local storage described below), processing unit(s) 604 can retrieve program instructions to execute and data to process in order to execute various operations described above.

In some server systems 600, multiple modules 602 can be interconnected via a bus or other interconnect 608, forming a local area network that supports communication between modules 602 and other components of server system 600. Interconnect 608 can be implemented using various technologies including server racks, hubs, routers, etc.

A wide area network (WAN) interface 610 can provide data communication capability between the local area network (interconnect 608) and the network 626, such as the Internet. Technologies can be used, including wired (e.g., Ethernet, IEEE 802.3 standards) and/or wireless technologies (e.g., Wi-Fi, IEEE 802.11 standards).

In some implementations, local storage 606 is intended to provide working memory for processing unit(s) 604, providing fast access to programs and/or data to be processed while reducing traffic on interconnect 608. Storage for larger quantities of data can be provided on the local area network by one or more mass storage subsystems 612 that can be connected to interconnect 608. Mass storage subsystem 612 can be based on magnetic, optical, semiconductor, or other data storage media. Direct attached storage, storage area networks, network-attached storage, and the like can be used. Any data stores or other collections of data described herein as being produced, consumed, or maintained by a service or server can be stored in mass storage subsystem 612. In some implementations, additional data storage resources may be accessible via WAN interface 610 (potentially with increased latency).

Server system 600 can operate in response to requests received via WAN interface 610. For example, one of modules 602 can implement a supervisory function and assign discrete tasks to other modules 602 in response to received requests. Work allocation techniques can be used. As requests are processed, results can be returned to the requester via WAN interface 610. Such operation can generally be automated. Further, in some implementations, WAN interface 610 can connect multiple server systems 600 to each other, providing scalable systems capable of managing high volumes of activity. Techniques for managing server systems and server farms (collections of server systems that cooperate) can be used, including dynamic resource allocation and reallocation.

Server system 600 can interact with various user-owned or user-operated devices via a wide-area network such as the Internet. An example of a user-operated device is shown in FIG. 6 as client computing system 614. Client computing system 614 can be implemented, for example, as a consumer device such as a smartphone, other mobile phone, tablet computer, wearable computing device (e.g., smart watch, eyeglasses), desktop computer, laptop computer, and so on.

For example, client computing system 614 can communicate via WAN interface 610. Client computing system 614 can include computer components such as processing unit(s) 616, storage device 618, network interface 620, user input device 622, and user output device 424. Client computing system 614 can be a computing device implemented in a variety of form factors, such as a desktop computer, laptop computer, tablet computer, smartphone, other mobile computing device, wearable computing device, or the like.

Processor 616 and storage device 618 can be similar to processing unit(s) 604 and local storage 606 described above. Suitable devices can be selected based on the demands to be placed on client computing system 614; for example, client computing system 614 can be implemented as a "thin" client with limited processing capability or as a high-powered computing device. Client computing system 614 can be provisioned with program code executable by processing unit(s) 616 to enable various interactions with server system 600 of a message management service such as accessing messages, performing actions on messages, and other interactions described above. Some client computing systems 614 can also interact with a messaging service independently of the message management service.

Network interface 620 can provide a connection to the network 626, such as a wide area network (e.g., the Internet) to which WAN interface 610 of server system 600 is also connected. In various implementations, network interface 620 can include a wired interface (e.g., Ethernet) and/or a wireless interface implementing various RF data communication standards such as Wi-Fi, Bluetooth, or cellular data network standards (e.g., 3G, 4G, LTE, etc.).

User input device 622 can include any device (or devices) via which a user can provide signals to client computing system 614; client computing system 614 can interpret the signals as indicative of particular user requests or information. In various implementations, user input device 622 can include any or all of a keyboard, touch pad, touch screen, mouse or other pointing device, scroll wheel, click wheel, dial, button, switch, keypad, microphone, and so on.

User output device 624 can include any device via which client computing system 614 can provide information to a user. For example, user output device 624 can include a display to display images generated by or delivered to client computing system 614. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). Some implementations can include a device such as a touchscreen that function as both input and output device. In some implementations, other user output devices 624 can be provided in addition to or instead of a display. Examples include indicator lights, speakers, tactile "display" devices, printers, and so on.

Some implementations include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processing unit(s) 604 and 616 can provide various functionality for server system 600 and client computing system 614, including any of the functionality described herein as being performed by a server or client, or other functionality associated with message management services.

It will be appreciated that server system 600 and client computing system 614 are illustrative and that variations and modifications are possible. Computer systems used in connection with implementations of the present disclosure can have other capabilities not specifically described here. Further, while server system 600 and client computing system 614 are described with reference to particular blocks, it is to be understood that these blocks are defined for convenience of description and are not intended to imply a particular physical arrangement of component parts. For instance, different blocks can be but need not be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, e.g., one or more components of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of these. Moreover, while a computer storage medium is not a propagated signal, a computer storage medium can include a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The terms "data processing apparatus", "data processing system", "client device", "computing platform", "computing device", or "device" encompasses all kinds of apparatus, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of these. The apparatus and execution environment can realize various different computing model infrastructures, such as web services, distributed computing, and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA or an ASIC.

Processors suitable for the execution of a computer program include, by way of example, both general and special purpose microprocessors, and any one or more processors of any kind of digital computer. Generally, a processor will receive instructions and data from a read-only memory or a random access memory or both. The elements of a computer include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a player, implementations of the subject matter described in this specification can be implemented on a computer having a display device, e.g., a CRT (cathode ray tube), plasma, or LCD (liquid crystal display) monitor, for displaying information to the player and a keyboard and a pointing device, e.g., a mouse or a trackball, by which the player can provide input to the computer. Other kinds of devices can be used to provide for interaction with a player as well; for example, feedback provided to the player can include any form of sensory feedback, e.g., visual feedback, auditory feedback, or tactile feedback; and input from the player can be received in any form, including acoustic, speech, or tactile input. In addition, a computer can interact with a player by sending documents to and receiving documents from a device that is used by the player; for example, by sending web pages to a web browser on a player's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a player can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as the gaming system described herein can include clients and servers. For example, the gaming system can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving input from a player interacting with the client device). Data generated at the client device (e.g., a result of an interaction, computation, or any other event or computation) can be received from the client device at the server, and vice-versa.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the gaming system could be a single module, a logic device having one or more processing modules, one or more servers, or part of a search engine.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one implementation are not intended to be excluded from a similar role in other implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations, elements, or acts of the systems and methods herein referred to in the singular may also embrace implementations including a plurality of these elements; and any references in plural to any implementation, element, or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementation," "one implementation," or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description, or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided may be useful for providing navigation-based and bonus selection games, the systems and methods described herein may be applied to other environments. The foregoing implementations are illustrative, rather than limiting, of the described systems and methods. The scope of the systems and methods described herein may thus be indicated by the appended claims, rather than the foregoing description, and changes that come within the meaning and range of equivalency of the claims are embraced therein.

What is claimed is:

1. A system, comprising:

one or more processors coupled to non-transitory memory, the one or more processors configured to:
- receive a wager for a play of a navigation game;
- randomly select a respective number of spaces for each row or column of a plurality of rows or columns for the play of the navigation game;
- randomly select a respective space condition for each space of each row or column of the plurality of rows or columns, at least one space in the row or column comprising a safe space condition;
- cause generation of a graphical user interface having the plurality of rows or columns, each row or column of the plurality of rows or columns comprising a respective set of spaces presented according to the respective number of spaces of the row or column, wherein the respective space condition for each space of each row or column is concealed, the respective space condition causing a game state to be updated for the play of the navigation game, the respective space condition of a subset of the respective set of spaces comprising a termination condition that causes the play of the navigation game to terminate;
- receive input to initiate navigation of an icon to a target space of the respective set of spaces of a first row or a first column of the plurality of rows or columns; and
- determine an updated game state for the play of the navigation game based on the respective space condition of the target space.

2. The system of claim 1, wherein the one or more processors are further configured to select the number of the respective set of spaces to be less than a predetermined threshold.

3. The system of claim 1, wherein the one or more processors are further configured to cause the game state to be updated to terminate the play of the navigation game responsive to determining that the respective space condition of the target space comprises the termination condition.

4. The system of claim 1, wherein the one or more processors are further configured to cause the graphical user interface to be updated to indicate an award amount for the play of the navigation game responsive to determining that the respective space condition of the target space comprises a win condition.

5. The system of claim 1, wherein the play comprises a health score having a predetermined value, wherein the one or more processors are further configured to determine that the respective space condition of at least one space within a row or a column is a predetermined decrement condition that causes the game state to be updated to decrement the health score of the play.

6. The system of claim 1, wherein the one or more processors are further configured to determine that the respective space condition causes the game state to accept additional input to navigate to a second row or a second column of the plurality of rows or columns.

7. The system of claim 1, wherein the one or more processors are further configured to generate a respective score for each row or column based on the respective space condition of each space of the plurality of rows or columns.

8. The system of claim 1, wherein the one or more processors are further configured to cause the graphical user interface to include an interactive element that, when interacted with, causes the one or more processors to update a credit balance based on a position of the icon in the plurality of rows or columns.

9. The system of claim 1, wherein the one or more processors are further configured to:

determine, based on the game state, that the icon has been navigated to a final row or a final column of the plurality of rows or columns; and adjust a credit balance based on a bonus amount responsive to determining that the icon has been navigated to the final row or the final column.

10. A method, comprising:

receiving, by one or more processors coupled to non-transitory memory, a wager for a play of a navigation game;

randomly selecting, by the one or more processors, a respective number of spaces for each row or column of a plurality of rows or columns for the play of the navigation game;

randomly selecting, by the one or more processors, a respective space condition for each space of each row or column of the plurality of rows or columns, at least one space in the row or column comprising a safe space condition;

causing, by the one or more processors, generation of a graphical user interface having the plurality of rows or columns, each row or column of the plurality of rows or columns comprising a respective set of spaces presented according to the respective number of spaces of the row or column, wherein the respective space condition for each space of each row or column is concealed, the respective space condition causing a game state to be updated for the play of the navigation game, the respective space condition of a subset of the respective set of spaces comprising a termination condition that causes the play of the navigation game to terminate;

receiving, by the one or more processors, input to initiate navigation of an icon to a target space of the respective set of spaces of a first row or a first column of the plurality of rows or columns; and determining, by the one or more processors, an updated game state for the play of the navigation game based on the respective space condition of the target space.

11. The method of claim 10, further comprising selecting, by the one or more processors, the number of the respective set of spaces to be less than a predetermined threshold.

12. The method of claim 10, further comprising causing, by the one or more processors, the game state to be updated to terminate the play of the navigation game responsive to determining that the respective space condition of the target space comprises the termination condition.

13. The method of claim 10, further comprising causing, by the one or more processors, the graphical user interface to be updated to indicate an award amount for the play of the navigation game responsive to determining that the respective space condition of the target space comprises a win condition.

14. The method of claim 10, wherein the play comprises a health score having a predetermined value, further comprising determining, by the one or more processors, that the respective space condition of at least one space within a row or a column is a predetermined decrement condition that causes the game state to be updated to decrement the health score of the play.

15. The method of claim 10, further comprising determining, by the one or more processors, that the respective space condition causes the game state to accept additional input to navigate to a second row or a second column of the plurality of rows or columns.

16. The method of claim 10, further comprising generating, by the one or more processors, a respective score for each row or column based on the respective space condition of each space of the plurality of rows or columns.

17. The method of claim 10, further comprising causing, by the one or more processors, the graphical user interface to include an interactive element that, when interacted with, causes the one or more processors to update a credit balance based on a position of the icon in the plurality of rows or columns.

18. The method of claim 10, further comprising:

determining, by the one or more processors, based on the game state, that the icon has been navigated to a final row or a final column of the plurality of rows or columns; and adjusting, by the one or more processors, a credit balance based on a bonus amount responsive to determining that the icon has been navigated to the final row or the final column.

* * * * *